(12) United States Patent
Bisht et al.

(10) Patent No.: US 10,248,746 B1
(45) Date of Patent: Apr. 2, 2019

(54) METHOD AND APPARATUS FOR ESTIMATING IDEAL POWER OF AN INTEGRATED CIRCUIT DESIGN

(71) Applicant: Cadence Design Systems, Inc., San Jose, CA (US)

(72) Inventors: Ajay Singh Bisht, San Jose, CA (US); Jayanta Roy, San Jose, CA (US); Kamlesh Kumar Madheshiya, San Jose, CA (US); Kunwar Prashant, Milpitas, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/379,356

(22) Filed: Dec. 14, 2016

(51) Int. Cl.
*G06F 17/50* (2006.01)
(52) U.S. Cl.
CPC .................. *G06F 17/5036* (2013.01)
(58) Field of Classification Search
CPC .................................................. G06F 17/5036

USPC ........................................................ 716/109
See application file for complete search history.

(56) References Cited

U.S. PATENT DOCUMENTS

2008/0288910 A1* 11/2008 Chaudhry ........... G06F 17/5022
716/116
2016/0154902 A1* 6/2016 Korthikanti ........... G06F 17/504
716/107

* cited by examiner

*Primary Examiner* — Suresh Memula
(74) *Attorney, Agent, or Firm* — McDermott Will & Emery LLP

(57) ABSTRACT

A method for determining power consumed by a circuit is described that includes identifying a redundant frame including one of a clock toggle or a data toggle that is not propagated to an output pin of the circuit and identifying a non-redundant frame comprising a clock toggle and a data toggle that are propagated to the output pin of the circuit. Further, the method includes determining an ideal power consumed by the circuit during the non-redundant frame and providing a feedback to the user, the feedback including the redundant frame, a source of the redundant frame, and the ideal power consumed by the circuit during the non-redundant frame.

20 Claims, 23 Drawing Sheets

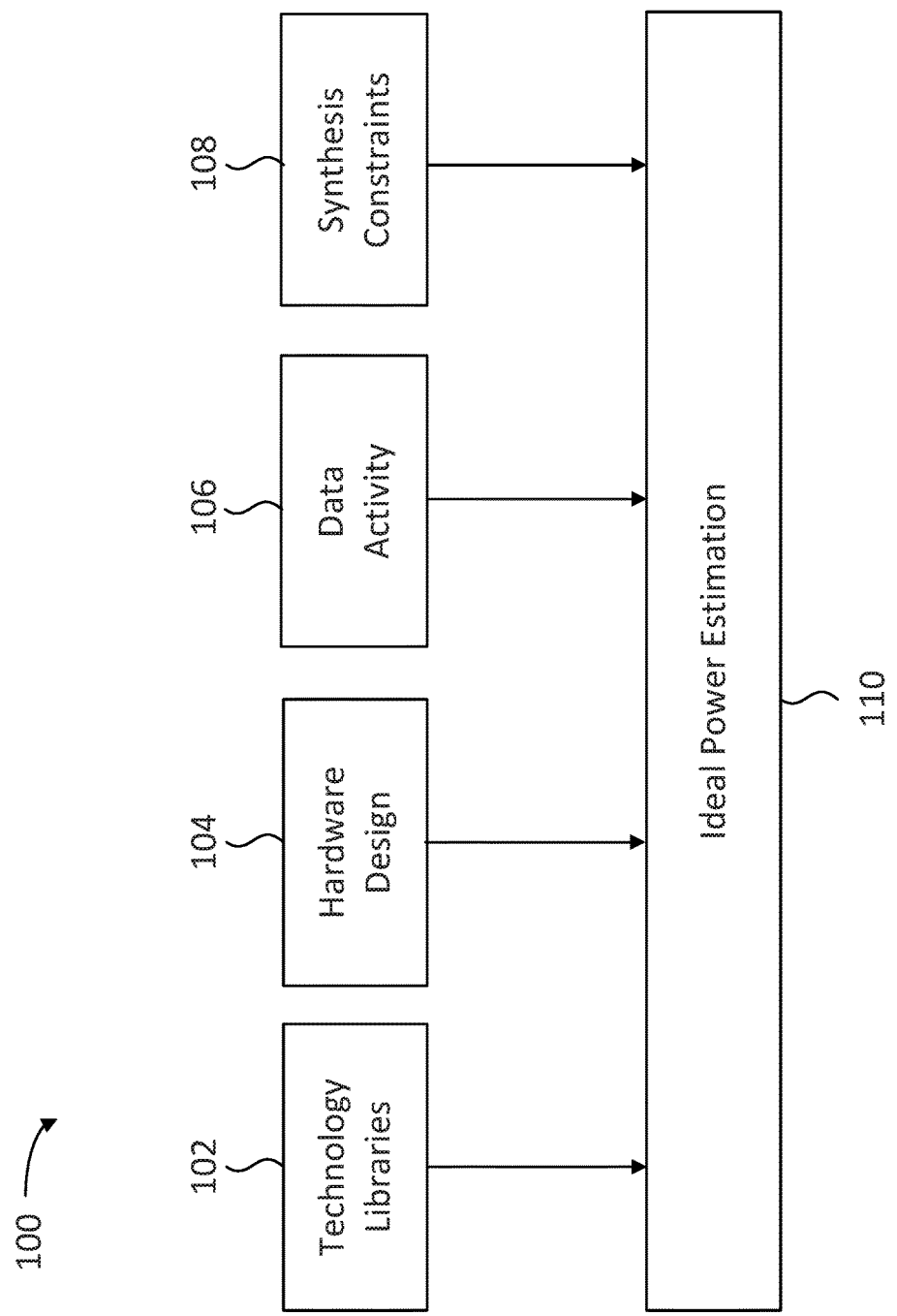

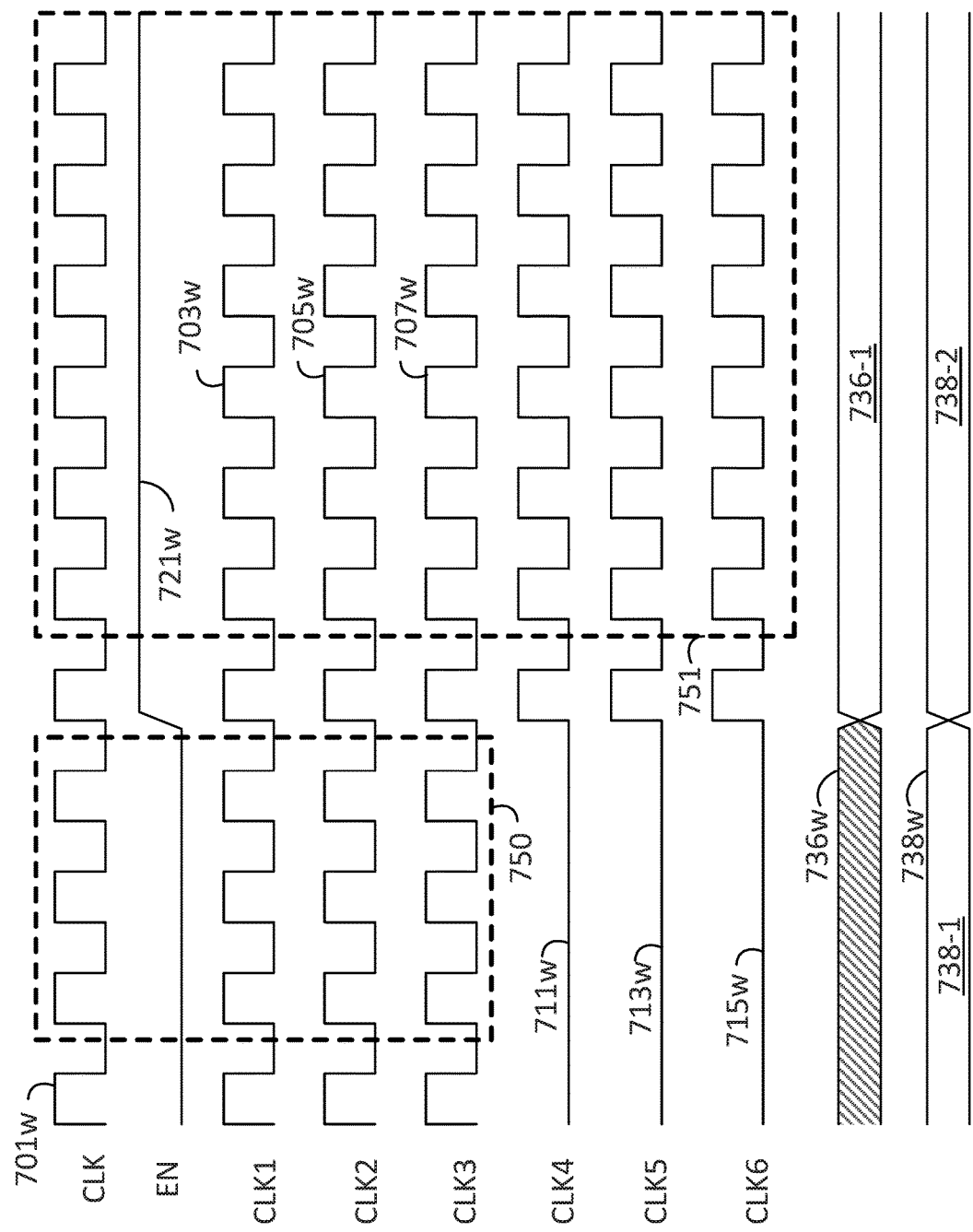

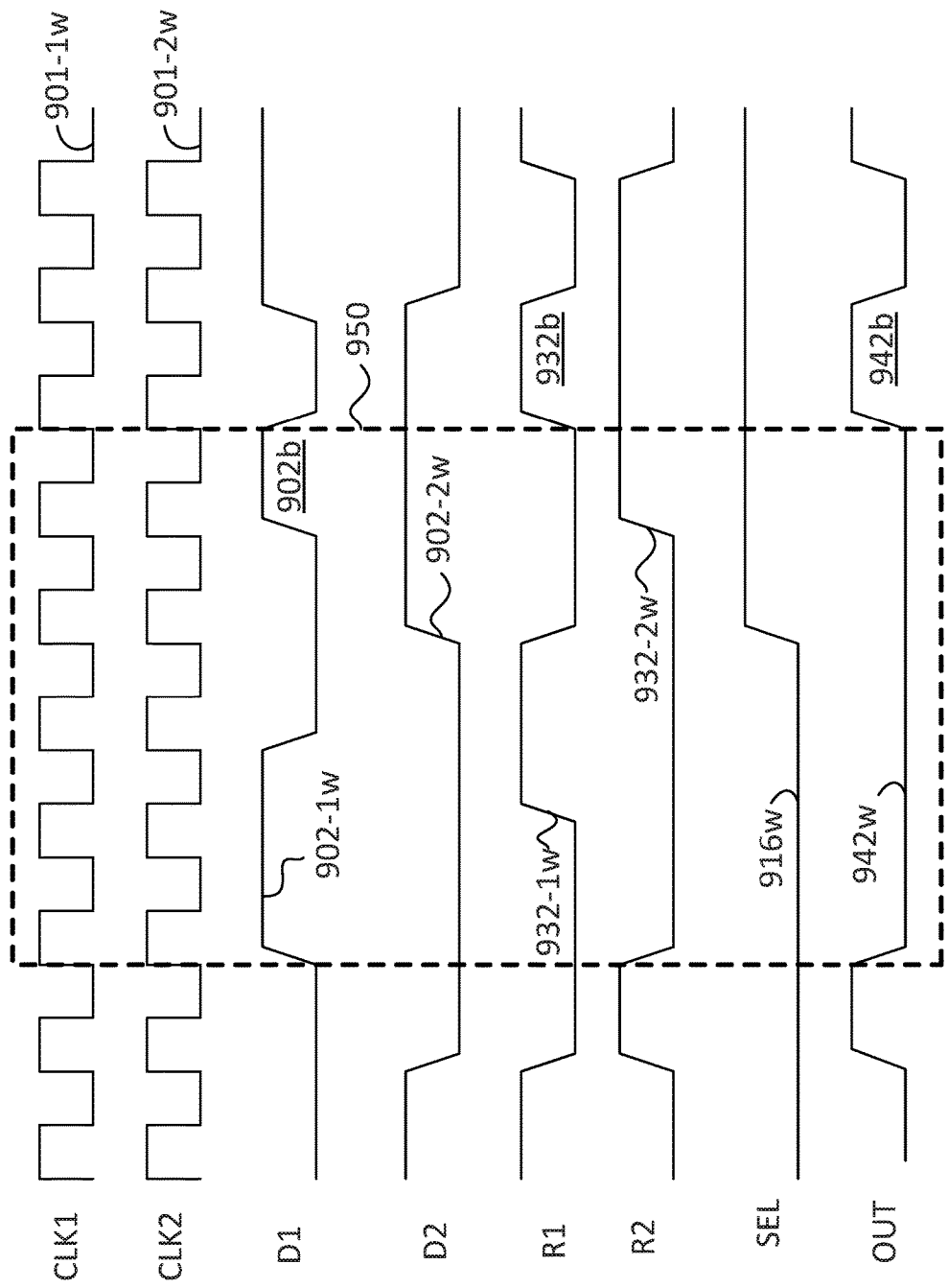

METHOD AND APPARATUS FOR ESTIMATING IDEAL POWER OF AN INTEGRATED CIRCUIT DESIGN

TECHNICAL FIELD

Embodiments described herein are generally related to the field of low power integrated circuit (IC) device modeling. In particular the present disclosure relates to computer-aided design (CAD) tools for power analysis and power optimization to optimize IC device modeling.

BACKGROUND

In traditional circuit design tools, designers reduce power consumption of the design by recurring to techniques such as clock gating, power gating, memory gating, operand isolation, bus encoding, among others. However, designers have little insight as to the limits of power consumption reduction. Moreover, in current IC designs and activity charts, the floor of consumed power by a circuit is typically unknown. This may result in unnecessary attempts by a designer to apply lengthy and cumbersome techniques with little to no effect in consumed power reduction.

The description provided in the background section should not be assumed to be prior art merely because it is mentioned in or associated with the background section. The background section may include information that describes one or more aspects of the subject technology.

SUMMARY

In a first embodiment, a computer-implemented method for determining power consumed by a circuit is described. The method includes identifying a redundant frame including one of a clock toggle or a data toggle that is not propagated to an output pin of the circuit and identifying a non-redundant frame including a clock toggle and a data toggle that are propagated to the output pin of the circuit. Further, the method includes determining an ideal power consumed by the circuit during the non-redundant frame and providing a feedback to a user, the feedback including the redundant frame, a source of the redundant frame, and the ideal power consumed by the circuit during the non-redundant frame.

In a second embodiment, a system is described that includes a memory storing computer code, and a processor that executes the computer code. When executing the computer code, the processor is configured to identify a redundant frame including one of a clock toggle or a data toggle that is not propagated to an output pin of a circuit and to identify a non-redundant frame including a clock toggle and a data toggle that are propagated to the output pin of the circuit. The processor is also configured to determine an ideal power consumed by the circuit during the non-redundant frame, and to provide a feedback to a user, the feedback including the redundant frame, a source of the redundant frame, and the ideal power consumed by the circuit during the non-redundant frame.

In yet another embodiment, a non-transitory, machine-readable storage medium is described that includes machine-readable instructions for causing a processor to execute a method for placing and routing devices in a circuit. The method includes identifying a redundant frame including one of a clock toggle or a data toggle that is not propagated to an output pin of the circuit, identifying a non-redundant frame including a clock toggle and a data toggle that are propagated to the output pin of the circuit, determining an ideal power consumed by the circuit during the non-redundant frame, and providing a feedback to a user, the feedback including the identified redundant frame, a source of the redundant frame, and the ideal power consumed by the circuit during the non-redundant frame.

Further, in some embodiments, a system is described for determining a power consumed by a circuit. The system includes a means for storing computer code. The system also includes a means for executing the computer code for determining a power consumed by a circuit. The means for executing the computer code is configured to identify a redundant frame including one of a clock toggle or a data toggle that is not propagated to an output pin of the circuit and to identify a non-redundant frame including a clock toggle and a data toggle that are propagated to the output pin of the circuit. The means for executing the computer code is also configured to determine an ideal power consumed by the circuit during the non-redundant frame, and to provide a feedback to a user, the feedback including the redundant frame, a source of the redundant frame, and the ideal power consumed by the circuit during the non-redundant frame.

BRIEF DESCRIPTION OF THE DRAWINGS

FIG. 1 is a block diagram illustrating inputs used for determining Ideal power of an IC device model, according to some embodiments.

FIG. 7B illustrates a plurality of signal waveforms including non-propagating frames in the circuit of FIG. 7A, according to some embodiments.

FIG. 9B illustrates a plurality of signal waveforms including non-propagating frames in the circuit of FIG. 9A, according to some embodiments.

In the figures, elements and steps denoted by the same or similar reference numerals are associated with the same or similar elements and steps, unless indicated otherwise.

DETAILED DESCRIPTION

Figure 2A:
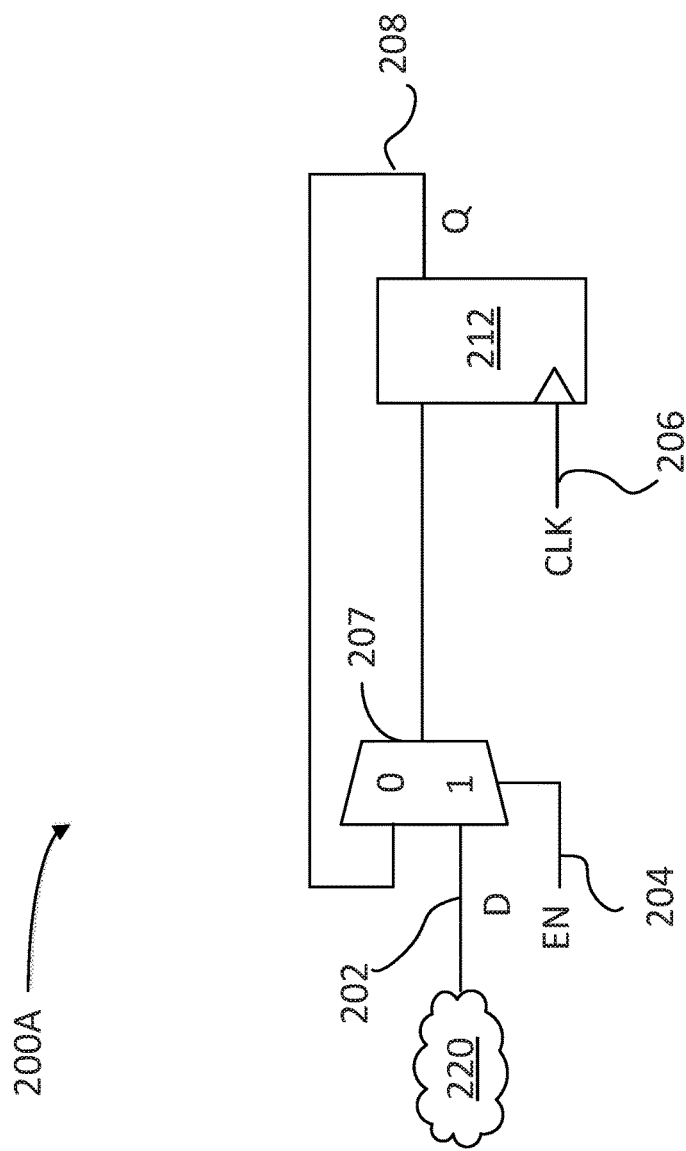
FIG. 2A illustrates a single register stage in a data pipeline for a circuit, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Lower power consumption is a desirable goal in integrated circuit (IC) device modeling. The rapid growth of the consumer market for battery-powered devices has made low power consumption desirable for the technical and commercial success of an integrated circuit. Methods and systems for low power consumption as disclosed herein include power optimization at many abstraction levels of a circuit model, from a System level description in a high-level language (e.g., SystemC), to a Register Transfer Level (RTL) description down to the silicon layer.

An Integrated Circuit (IC) system processes digital data (e.g., performs an "activity"), in which the system draws current from a power source and dissipates power to the environment. In some embodiments, computer-aided design (CAD) tools as disclosed herein provide an estimate of the amount of power the IC device model may dissipate in view of a pre-determined activity flowing through the system.

In some embodiments, methods and systems are provided to estimate an ideal power consumed by integrated circuit (IC) device that includes large circuit blocks. An ideal power is understood herein as a minimum value of power consumption that may be expected from the device under any given operational configuration. IC devices as disclosed herein can be represented as models in the form of a HDL. The models can include both synthesizable constructs and technology mapped library cell instantiations. In some embodiments, a method includes identification of non-propagated activities in the model based on, but not limiting to, a simulation vector. The simulation vector is an input vector including simulated circuit activity. Methods as disclosed herein compute power consumption of the IC device model by identifying non-propagated activities from the total activities in the model. In some embodiments, a method also identifies one or more sources of non-propagated activities so that remedial actions can be performed, if available.

Some embodiments as described herein include techniques to identify and quantify redundant activity flowing through the system, which if removed, preserves the functionality of the IC device and reduces its power consumption.

In certain aspects, power consumption of an IC device model is directly proportional to the amount of switching activity annotated on the IC elements from a stimulus (e.g., the simulation vector). In some embodiments, a method creates several partitions of the stimulus and refers to them as frames. Multiple frames at different blocks and stages may represent the total activity from the stimulus for the IC device model. The method may further distinguish switching activities in the frames into two classes of activities: propagating activities and non-propagating activities. Propagating activities represent activities resulting in output(s) of the IC device model, whereas non-propagating activities correspond to activities that do not result in an output of the IC device model (do not "propagate"). In some embodiments, a method performs cycle-based analysis involving multiple clock cycles to identify non-propagating activities in the IC device model. In some embodiments, a method groups the non-propagating activities into redundant frames and associates them with the respective circuit elements. The method then calculates power usage of the system by removing the redundant frames from the IC-device model. In some aspects, this is the ideal power of the IC device model. Apart from the ideal power estimation, in some embodiments the method automatically identifies the sources of the redundant frames so that the IC device model can be modified to remove redundant frames from the system.

Removing non-propagating activities reduces power consumption of the IC device without changing functionality. Embodiments as disclosed herein identify redundant activity and estimate ideal power automatically for IC devices including millions of circuit elements, thereby simplifying the analysis for a user simulating or emulating the performance of the IC device model. Accordingly, methods and systems as disclosed herein are desirable for accuracy and computation efficiency in complex and lengthy tests for real world applications of IC device models. For example, current IC device models may include billions ($10^9$) of transistors, and each simulation run may incorporate thousands, or millions ($10^3$-$10^6$), of clock cycles for all the transistors. Thus, the computation steps desired to carry out accurate power consumption determination may range in the order of $10^{12}$-$10^{15}$, or higher. Therefore, automated methods and systems as disclosed herein are desirable to accurately estimate power consumption in such complex environments, and reduce cost and complexity of IC device modeling.

Methods and systems as disclosed herein provide an improvement to computer functionality by allowing a more efficient and accurate simulation and emulation of IC device models, thereby reducing power consumption of the computer and enabling the computer to perform a larger number of parallel operations. More specifically, by identifying redundant activity frames in an IC device model, methods and systems as disclosed herein enable the modeling of highly efficient IC devices that require a reduced number of computational cycles for simulation and emulation, thereby speeding the simulation and emulation process.

Furthermore, methods and systems as disclosed herein provide a solution to the technical problem of reducing the power consumption of IC devices. More specifically, methods and systems as disclosed herein provide a floor value or a minimum value for the power consumption of a given IC device model, thereby enabling a designer to identify bottlenecks in the IC device model, improve the IC device model, and be able to make a decision when the IC device model is finished or a different IC device model should be considered for the same task.

FIG. 1 is a block diagram 100 illustrating inputs used for determining Ideal power of an IC device model, according to some embodiments. Technology libraries 102 provide gate level cell models with timing and power characteristics modeled in the form of non-linear models. The method assumes technology libraries in the Liberty format, an EDA library modeling standard. Hardware design 104 represents the integrated circuit (IC) whose ideal power is to be estimated. It may be written in the form of any HDL including, but not limited to Verilog, VHDL and System-Verilog. The IC device model stage may be register transfer (RTL) or gate level. In some embodiments, the ideal power of hardware design 104 is determined according to a data activity 106. Data activity 106 may include a simulation vector that represents a test vector of simulated circuit activity for the IC device model. The simulation vector may be provided in the form of any waveform format including, but not limited to Value Change Dump (VCD), Fast Signal Database (FSDB), Incisive simulator format (SHM), and Palladium emulator format (PHY). Synthesis constraints 108 includes, at a minimum, clock specifications (e.g., clock waveforms, frequency, etc.). If the IC device model includes a RTL stage, then constraints for area, timing, power and runtime vs. accuracy may also be provided.

The following figures illustrate different instances of IC modeling in which methods and systems as disclosed herein are applied to determine the presence of redundant activity in the form of non-propagating frames including both clock and data activity. The presence of redundant activity in an IC model enhances the ability of a user to establish, from a determination of the total power consumed by a circuit, which elements in the circuit may be modified to reduce the total power consumed.

FIG. 2A illustrates a single register stage 200 in a data pipeline, according to some embodiments. Register stage 200 has not been clock-gated. Register stage 200 includes a register (or flip-flop) 212 with a synchronous load enable condition imposed by multiplexer 207. A clock pin 206 clocks register 212 in every clock cycle. A data pin 202 receives data values generated by logic circuit 220. An 'enable' (EN) pin 204 enables register 212 to load the data value from data pin 202 and transfer the data value to an output pin (q) 208. Accordingly, a non-propagating activity in register stage 200 may occur when clock pin 206 receives a clock toggle when there is no toggling of a data value in data pin 202 (data value remains unchanged from last clock toggle).

Figure 2B:
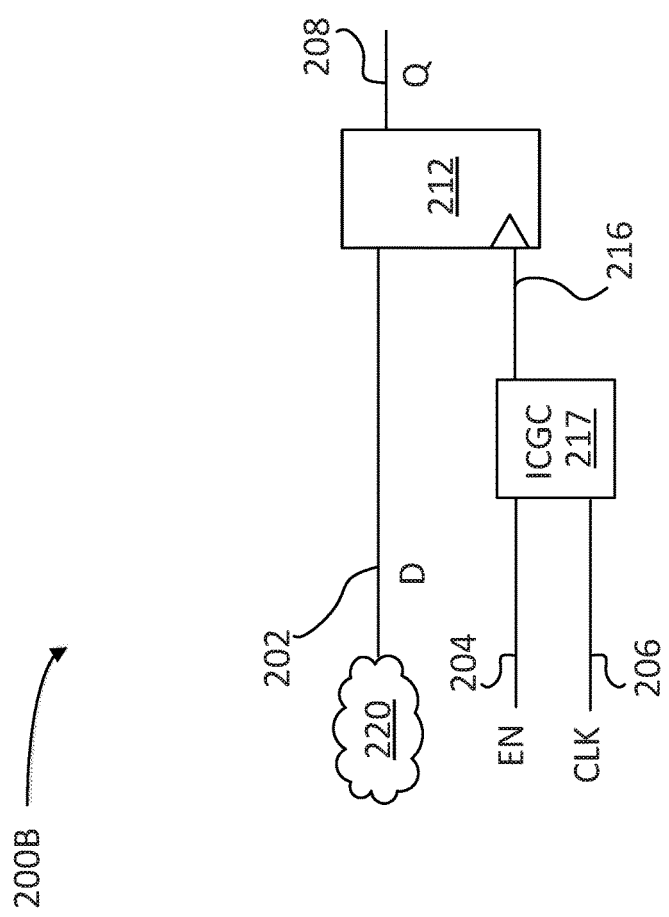
FIG. 2B illustrates a single register stage in a data pipeline for a circuit including a clock gate circuit, according to some embodiments.

FIG. 2B illustrates a single register stage 200B in a data pipeline for a circuit, including a clock-gate circuit (ICGC) 217, according to some embodiments. In single register stage 200B the synchronous load enable multiplexer 207 of register stage 200A has been removed. ICGC 217 drives clock pin 216 of register 212. Clock pin 206 and EN pin 204 provide inputs to ICGC 217 so that a clock signal is transferred to clock pin 216 of register 212. ICGC 217 has an internal circuitry ensuring that a clock cycle does not reach register 212 unless EN pin 204 is in a high logic state.

Figure 2C:
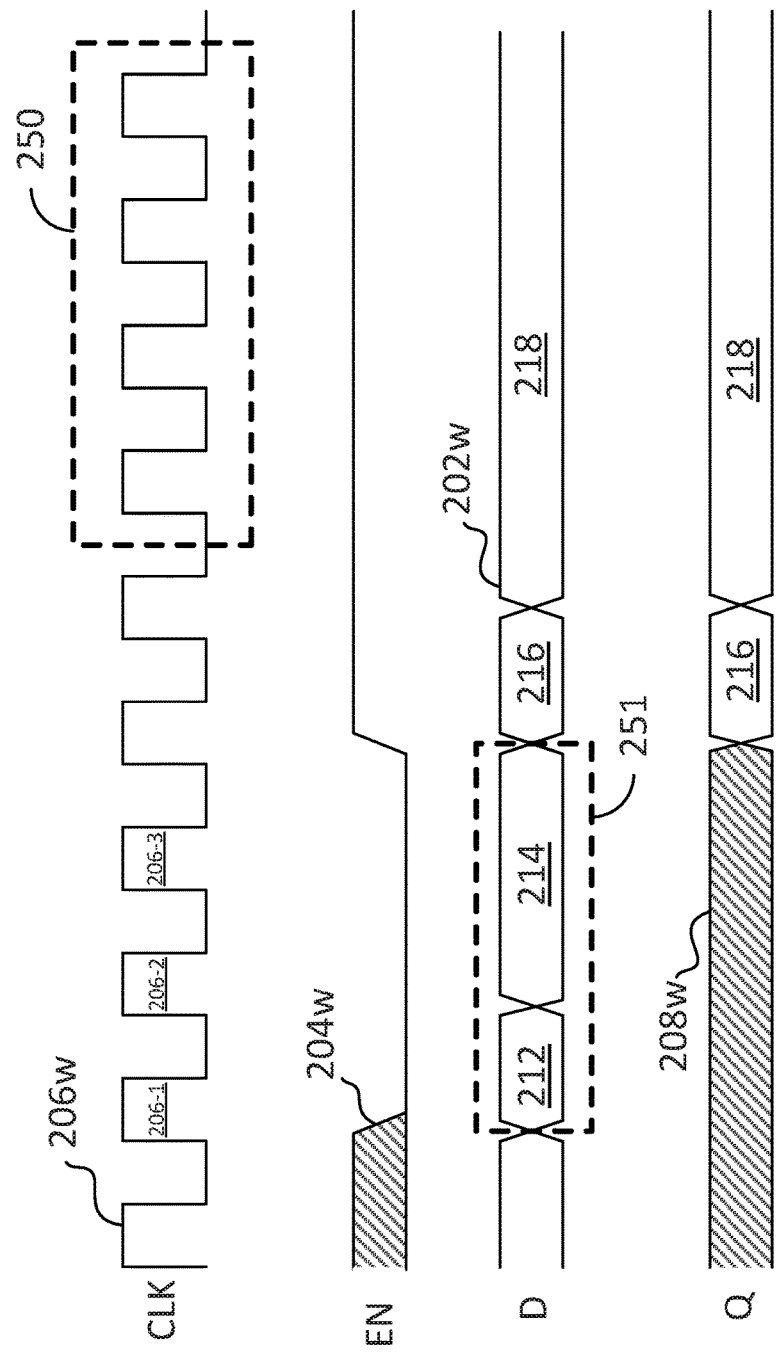
FIG. 2C illustrates a plurality of waveforms including a non-propagating frame in the data pipeline of FIGS. 2A and 2B, according to some embodiments.

FIG. 2C illustrates a plurality of waveforms including non-propagating frames 250 and 251 in the data pipeline of FIGS. 2A and 2B, according to some embodiments. A waveform 206w includes about ten (10) cycles of clock 206, out of which three (3) clock cycles 206-1, 206-2, and 206-3 are disabled by EN pin 204 through a low value in waveform 204w. Waveform 202w from data 202 includes toggles for data values 212, 214, 216 and 218, some of which propagate to output waveform 208w from output pin 208.

Methods as disclosed herein may determine a frame 250 and a frame 251 as non-propagated within a single register cycle. Frame 251 includes toggles for data values 212 and 214, which do not propagate to output waveform 208w because they overlap with a low value in waveform 204w. Frame 251 includes the last four cycles of clock waveform 206w, which are redundant because no toggles for new data in waveform 204w overlap with the clock activity in frame 251, and waveform 208w remains unchanged with data value 218.

Figure 3A:
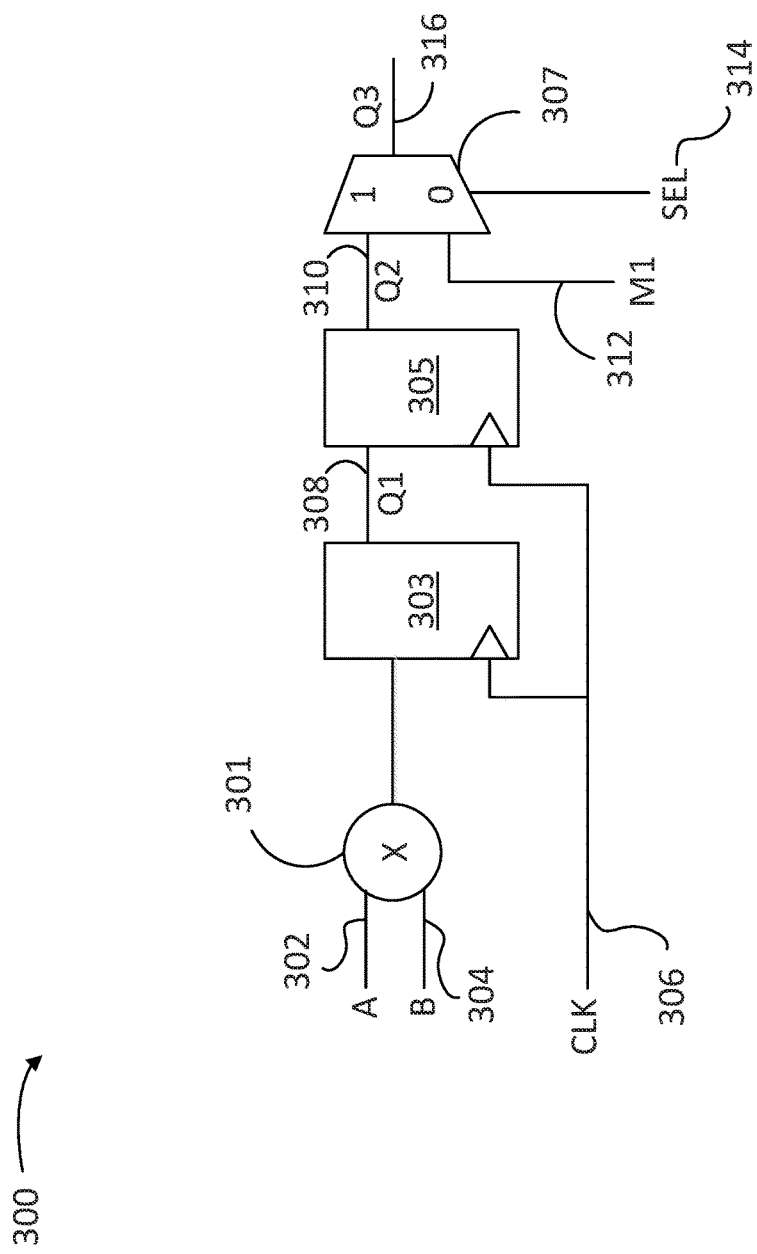
FIG. 3A illustrates a signal flow in a data pipeline including multiple register stages, according to some embodiments.

FIG. 3A illustrates a signal flow in a data pipeline 300 including multiple register stages 303 and 305, according to some embodiments. Data pipeline 300 includes, without any limitation, a multiplier 301 as a logic element operating with input data 302 (A) and input data 304 (B). Register stages 303 and 305 share the same clock signal 306. An output pin 308 from register 303 (with a value Q1) is coupled as a data input to a register 305, which has an output pin 310 (with a value Q2) coupled with a high port in a multiplexer 307. Multiplexer 307 receives selection signal 314 (SEL) to provide an output through output pin 316 (with a value Q3). A low port 312 (with value M1) in multiplexer 307 may be driven by an external logic circuit. Accordingly, when SEL 314 is high, multiplexer 307 provides the value in pin 310 to output pin 316 (Q3=Q2), and when SEL 314 is low, multiplexer 307 provides the value in port 312 to output pin 316 (Q3=M1).

Figure 3B:
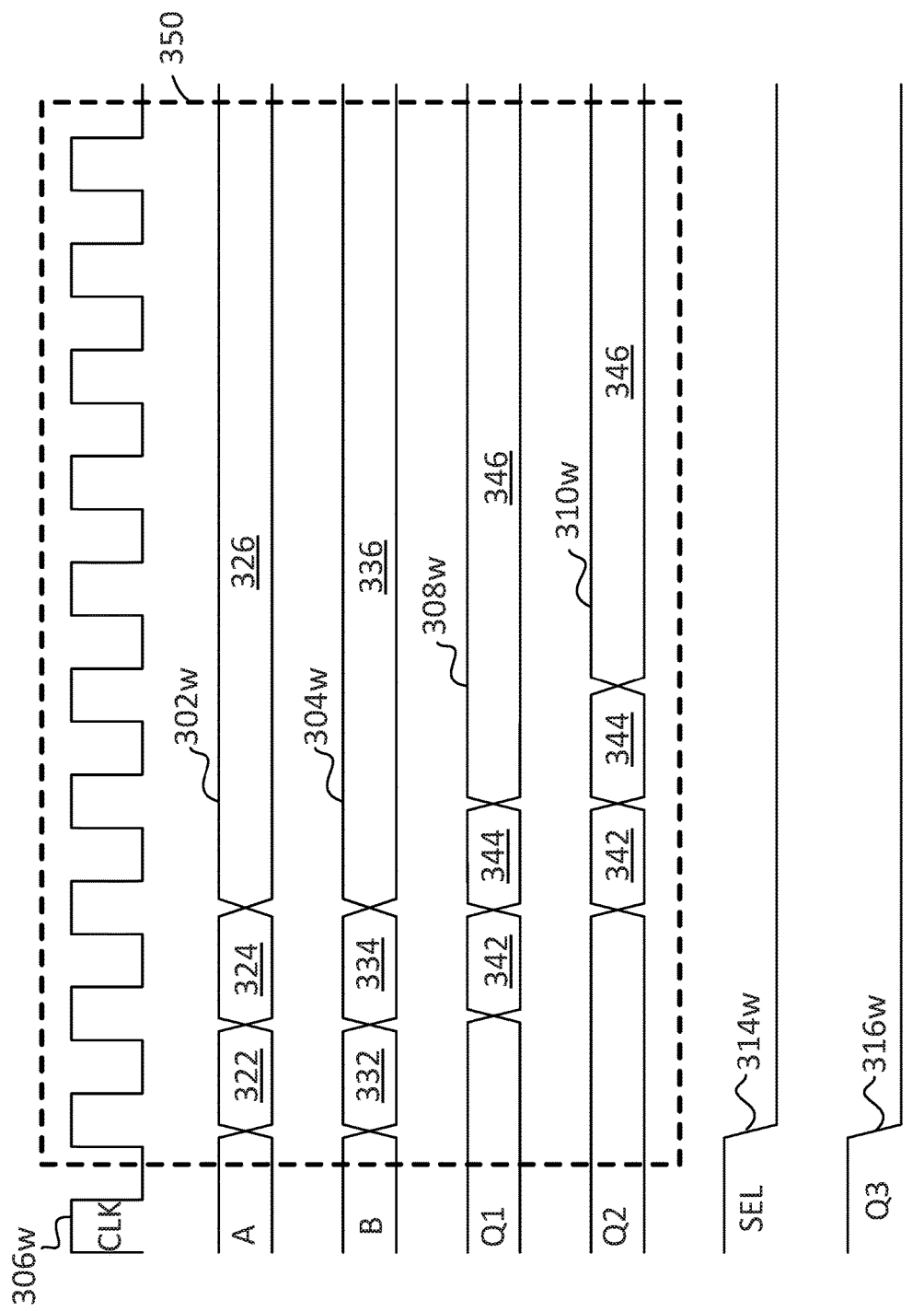
FIG. 3B illustrates a plurality of waveforms including a non-propagating frame in the data pipeline of FIG. 3A, according to some embodiments.

FIG. 3B illustrates a plurality of waveforms including a non-propagating frame 350 in data pipeline 300, according to some embodiments. Frame 350 includes about ten (10) redundant clock cycles in clock waveform 306w, input data waveforms 302w, 304w, waveform 308w for values Q1 from output pin 308, and waveform 310w for values Q2 from output pin 310. In frame 350, waveform 302w toggles from a value 322 (e.g., 'A=1') to a value 324 (e.g., 'B=2') in the next clock cycle and then to a value 326 (e.g., 'A=3') for the remaining seven clock cycles or so. Likewise, waveform 304w toggles from a value 332 (e.g., 'B=3') to a value 334 (e.g., 'B=4') in the next clock cycle and then to a value 336 (e.g., 'B=5') for the remaining seven clock cycles. Accordingly, waveform 308w toggles to value 342 (e.g., 'Q2=3'='1'×'3') and to value 344 (e.g., 'Q2=8'='2'×'4') in the next clock cycle, and then to a value 346 (e.g., 'Q2=15'='3'×'5') for the remaining seven clock cycles. Waveform 310w is a one clock cycle delayed carry-over of waveform 308w, as performed by register 305. However, an output waveform 316w does not reflect the value of Q2 throughout frame 350 because waveform 314w is low. Accordingly, SEL signal 314 in waveform 314w prevents signal toggling in frame 350 from propagating out of pipeline 300. Thus, methods consistent with the present disclosure identify activities in frame 350 as non-propagated because the value Q2 is not transferred to output waveform 316w (Q3). Note that, without limitation, waveform 316w indicates Q3=0, which corresponds to a value of M1=0 in low port 312 of multiplexer 307.

Figure 4A:
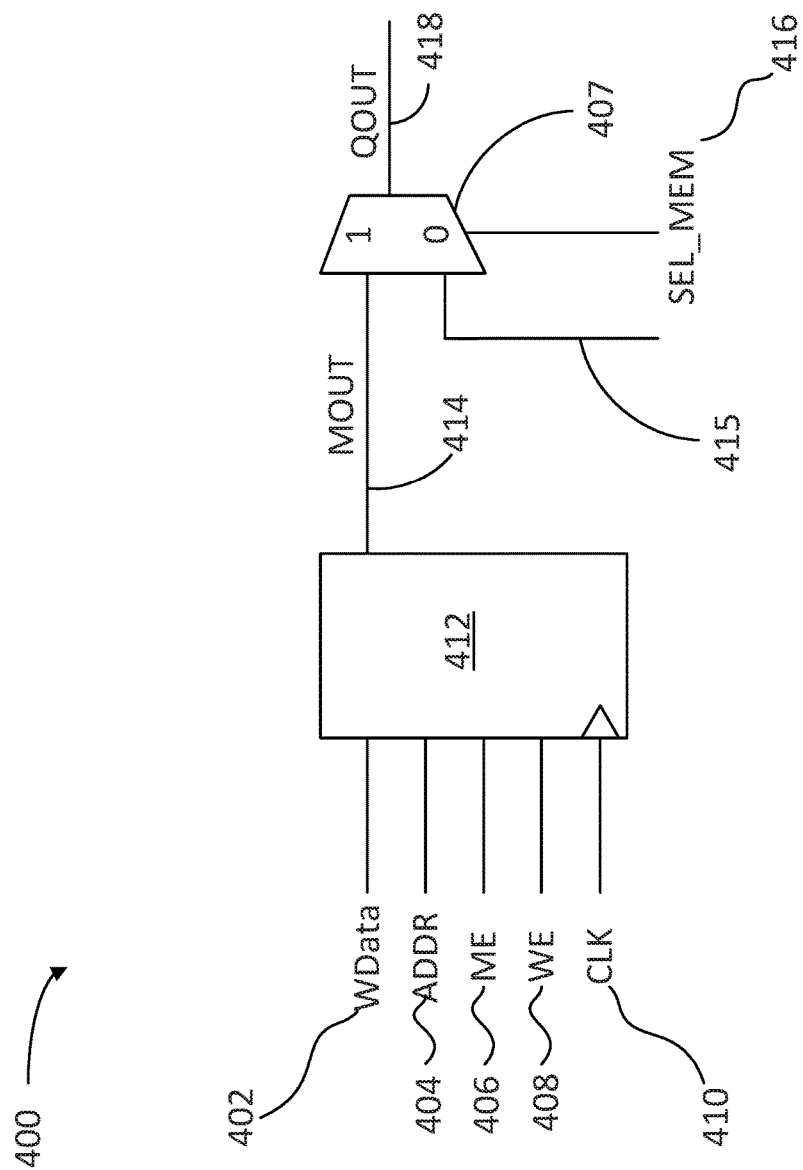
FIG. 4A illustrates a signal flow in a memory circuit, according to some embodiments.

FIG. 4A illustrates a signal flow 400 in a memory circuit 412, according to some embodiments. Without limitation to embodiments consistent with the present disclosure, memory circuit 412 is of a type "one-read or write" (1RW), which means that in a single clock cycle memory circuit 412 can either perform a "Write" operation or a "Read" operation. Some embodiments may include a "one-read, one-write" (1R1 W) memory circuit, wherein a Read operation may be performed together with an independent Write operation during a single clock cycle. A write operation happens at the positive edge of a toggle from clock 410 (CLK) when a memory enable pin 406 (ME or "master" signal) and a write enable pin 408 (WE) are both in logic high states. Such cycles are referred-to as write cycles of memory. In write cycles, bus 404 (ADDR) contains the location in which to write data from a pin 402 (WDATA). A read operation happens at the positive edge of a toggle from clock 410 when ME 406 is in logic high state but WE 408 is in a logic low state. Such cycles are referred to as 'read' cycles of memory. During the read operation, ADDR bus 404 contains the location in memory circuit 412 to read data. A pin 418 (QOUT) provides the output of memory circuit 412. Multiplexer 407 passes a memory data MOUT 414 to QOUT 418 when a pin 416 (SEL MEM) is in a logic high state. Otherwise, multiplexer 407 passes an external data 415 when SEL MEM 416 is in a logic low state.

Figure 4B:
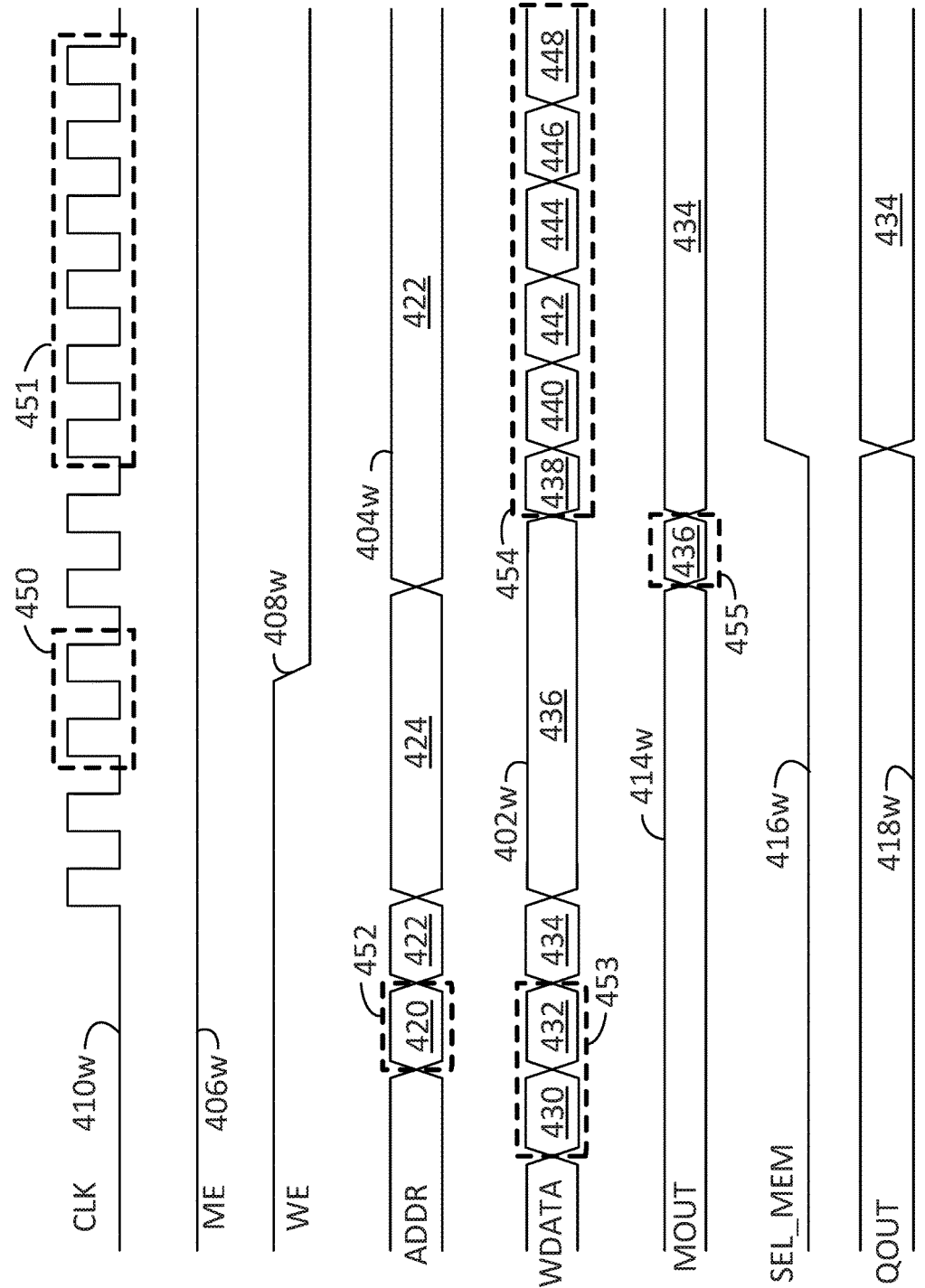
FIG. 4B illustrates a plurality of signal waveforms including non-propagating frames in the circuit of FIG. 4A, according to some embodiments.

FIG. 4B illustrates a plurality of signal waveforms including different types of non-propagating frames 450, 451, 452, 453, 454 and 455 in signal flow 400, according to some embodiments. In frame 450, clock activity from waveform 410w is redundant because waveform 408w indicates that memory circuit 412 is in write mode with a stable data value 436 in waveform 402w and a stable address value 424 in waveform 404w. Accordingly, data value 436 is already written in address 424 of memory circuit 412 during the redundant clock activity of frame 450.

In frame 451, clock activity from waveform 410w is redundant because waveform 408w indicates a read mode (low state) in WE 408, with stable address data 422 in waveform 404w from ADDR 404. There are no intervening writes from waveform 408w in frame 451. Thus, the data value in address 422 of memory circuit 412 is already read when the redundant clock activity in frame 451 takes place. In frames 452 and 453 data and address activities are redundant when there is no active clock in waveform 410w. Accordingly, data 430 and 432 are not written into memory circuit 412. Thus, the toggling of waveform 404w and waveform 402w from WDATA 402 in frames 452 and 453, respectively, is redundant. In frame 454 data activity in waveform 402w is redundant when waveform 408w is in read mode (low WE signal). Accordingly, data entries 438, 440, 442, 444, 446 and 448 are not written in memory circuit 412 and thus the toggling of waveform 402w from WDATA 402 in frame 454 is redundant.

In frame 455 a data entry 436 in waveform 414w is read from pin 414 (MOUT) due to a read status of memory circuit 412 (waveform 408w in low state). Accordingly, data entry 436 is not propagated to output waveform 418w in QOUT 418 because waveform 416w provides a low state to SEL MEM 416 in multiplexer 407. Accordingly, multiplexer 407 transfers data from external pin 415 into QOUT 418 instead of data value 436 (414w) from address 424 in memory circuit 412. Thus, toggling data value 436 in frame 455 is redundant. Note that when waveform 414w turns to a high value, the data value in MOUT 414 (cf. waveform 414w) is data value 434, which is read from address 422 (cf. waveform 404w, and waveform 408w in low state). Note also that the portions of waveform 410w outside of frames 450 and 451 include the writing of data value 434 in memory address 422, which is successfully read out in waveform 418w from QOUT 418 in memory circuit 412.

Figure 5A:
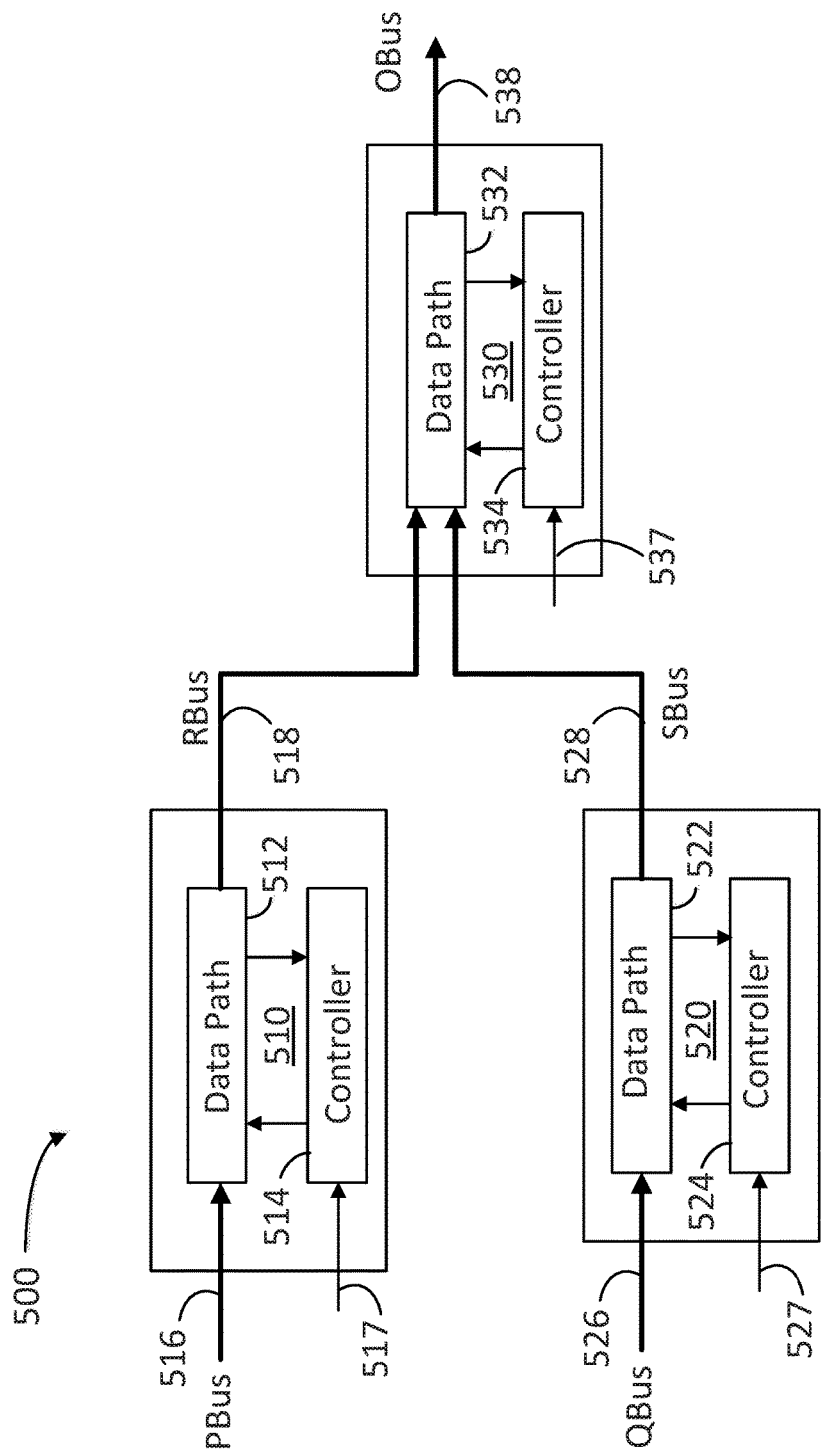
FIG. 5A illustrates a block tree with multiple circuit blocks in a circuit, according to some embodiments.

FIG. 5A illustrates a block tree 500 with multiple circuit blocks 510, 520, and 530 in a circuit, according to some embodiments. In some embodiments, circuit block 530 may be a receiver responding to a first driver in circuit block 510 and a second driver in circuit 520. Circuit block 510 includes a data path block 512 that interacts with a controller block 514. Data path block 512 receives an input data stream from PBus 516. Controller block 514 receives an input 517 that interacts with data path block 512 to process the input data stream from PBus 516 and thereby to determine an output data stream in RBus 518. Likewise, circuit block 520 includes a data path block 522 that interacts with a controller block 524. Data path block 522 receives an input data stream from QBus 526. Controller block 524 receives an input 527 that interacts with data path block 522 to process the input data stream from QBus 526 and thereby to determine an output data stream in SBus 528. Circuit block 530 includes a data path block 532 that interacts with a controller block 534. Data path block 532 receives a first input data stream from RBus 518 and a second input data stream from SBus 528. Controller block 534 receives an input 537 that interacts with data path block 532 to process the first and second input data streams and thereby to determine an output data stream in OBus 538.

Figure 5B:
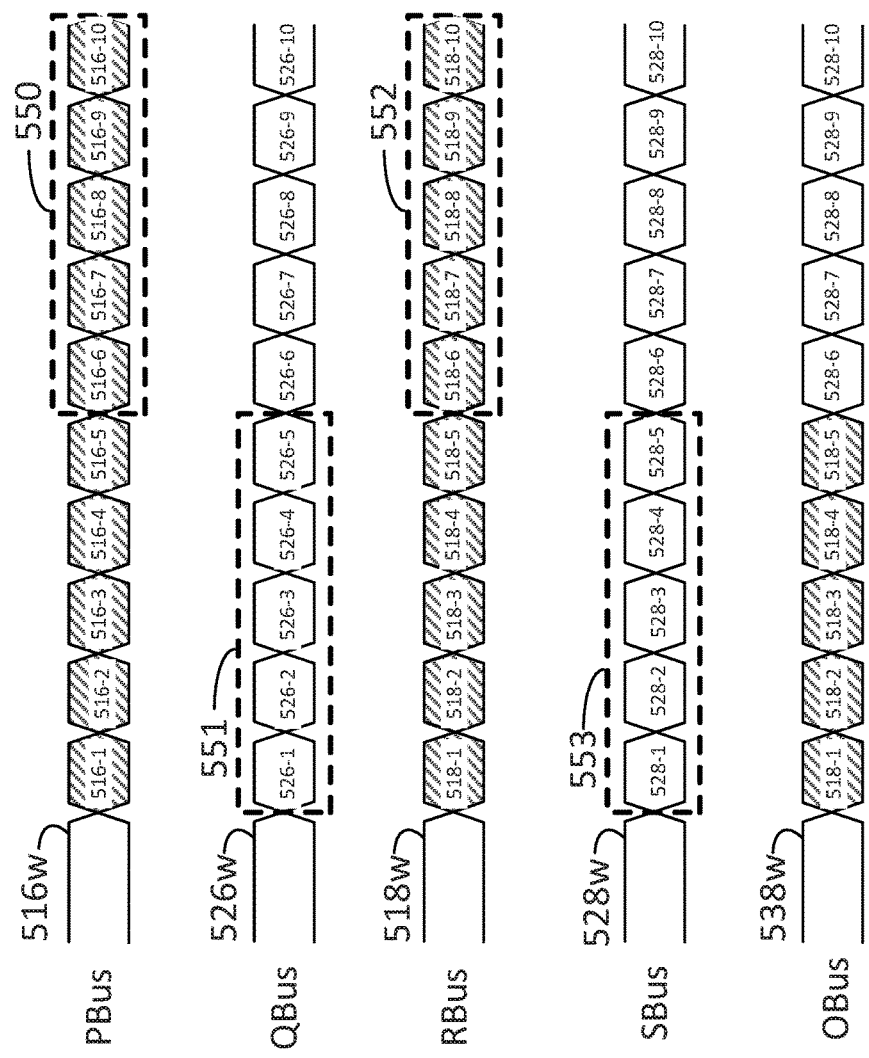
FIG. 5B illustrates multiple non-propagating frames in the block tree of FIG. 5A, according to some embodiments.

FIG. 5B illustrates multiple non-propagating frames 550, 551, 552, and 553 in block tree 500, according to some embodiments. Frame 550 includes waveform 516w (PBus) toggling data values 516-6, 516-7, 516-8, 516-9, and 516-10 that are not propagated to output waveform 538w (OBus). Likewise, frame 551 includes waveform 526w (QBus) toggling data values 526-1, 526-2, 526-3, 526-4, and 526-5 that are not propagated to output waveform 538w. Similarly, frame 552 includes waveform 518w (RBus) toggling data values 518-1, 518-2, 518-3, 518-4, and 518-5 that are not propagated to output waveform 538w (SBus). Moreover, frame 553 includes waveform 528w toggling data values 528-1, 528-2, 528-3, 528-4, and 528-5 that are not propagated to output waveform 538w. The specific configuration of output waveform 538w is determined by external signal 537 and logic circuitry in controller block 534. More generally, it is expected that either one of data streams from RBus 518 or from SBus 528 will be redundant for at least one or more clock cycles throughout block tree 500.

FIGS. 5A and 5B show the application of methods and systems as disclosed herein at a larger scale, in a HDL beyond a RTL description of an IC device model. Accordingly, a result as shown in non-propagating frames 550, 551, 552 and 553 may indicate the user that certain logic components within the IC device are not properly defined. More specifically, non-propagating frames 550, 551, 552, and 553 may indicate to a user that the logic circuitry leading to inputs 517, 527 and 537 may be revised to reduce the number and size of redundant frames 550, 551, 552 and 553.

The block size is an indication of the abstraction level in the IC device model. A larger block size, while including more individual components, may have a reduced number of input/output registers to control the operation of the entire block. Without limitation, it is expected that the rate of switching be reduced as the size of the block increases because the time it takes for an output signal to exit the block is proportional to the block size, or abstraction level. By the same token, a reduction of redundant frames in larger blocks includes a larger reduction in power consumption, because multiple internal processes are also eliminated.

Figure 5C:
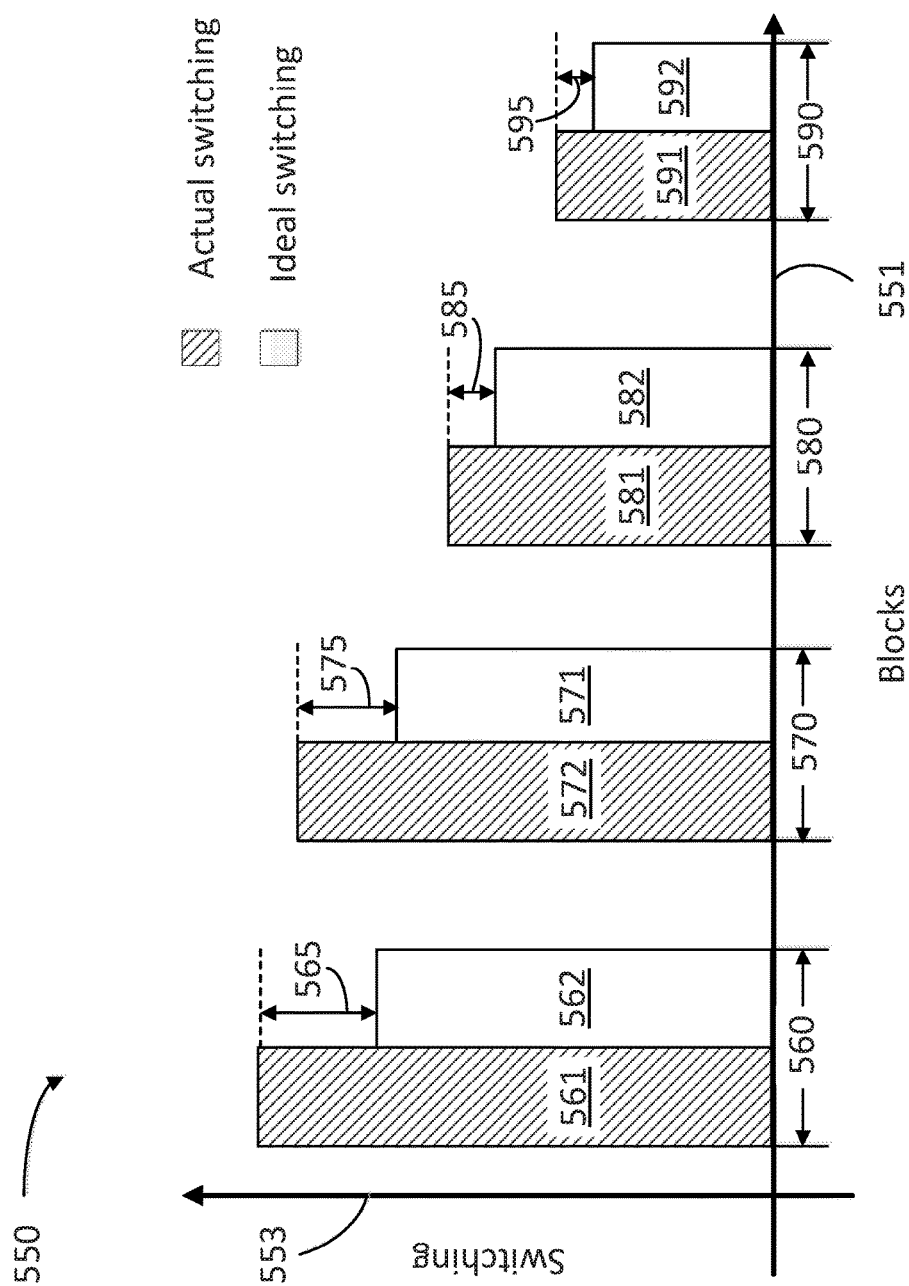
FIG. 5C illustrates a chart of switching activity vs. block in a block tree consistent with FIG. 5A, according to some embodiments.

FIG. 5C illustrates a chart 550 of switching activity vs. block in block tree 500, according to some embodiments. In the exemplary embodiment of chart 550, circuit blocks 560, 570, 580 and 590 are arranged along the abscissae (X-axis) in order of decreasing switching activity. Chart 550 shows ideal switching activity and actual switching activity in the IC device model for each block. Thus, the gap 565 indicates difference between actual switching activity 561 and ideal switching activity 562 for block 560. The gap 565 indicates difference between actual switching activity 561 and ideal switching activity 562 for block 560. The gap 575 indicates the difference between actual switching activity 571 and ideal switching activity 572 for block 570. The gap 585 indicates the difference between actual switching activity 581 and ideal switching activity 582 for block 580. The gap 595 indicates the difference between actual switching activity 591 and ideal switching activity 592 for block 590. Accordingly, in some embodiments a display may show a graph or chart similar to chart 550 so that a user of methods and systems as disclosed herein may revise an IC device model, prioritizing the modeling analysis in a block having a larger switching gap (e.g., block 560 prior to blocks 570, 580 and 590, in that order).

Figure 6:
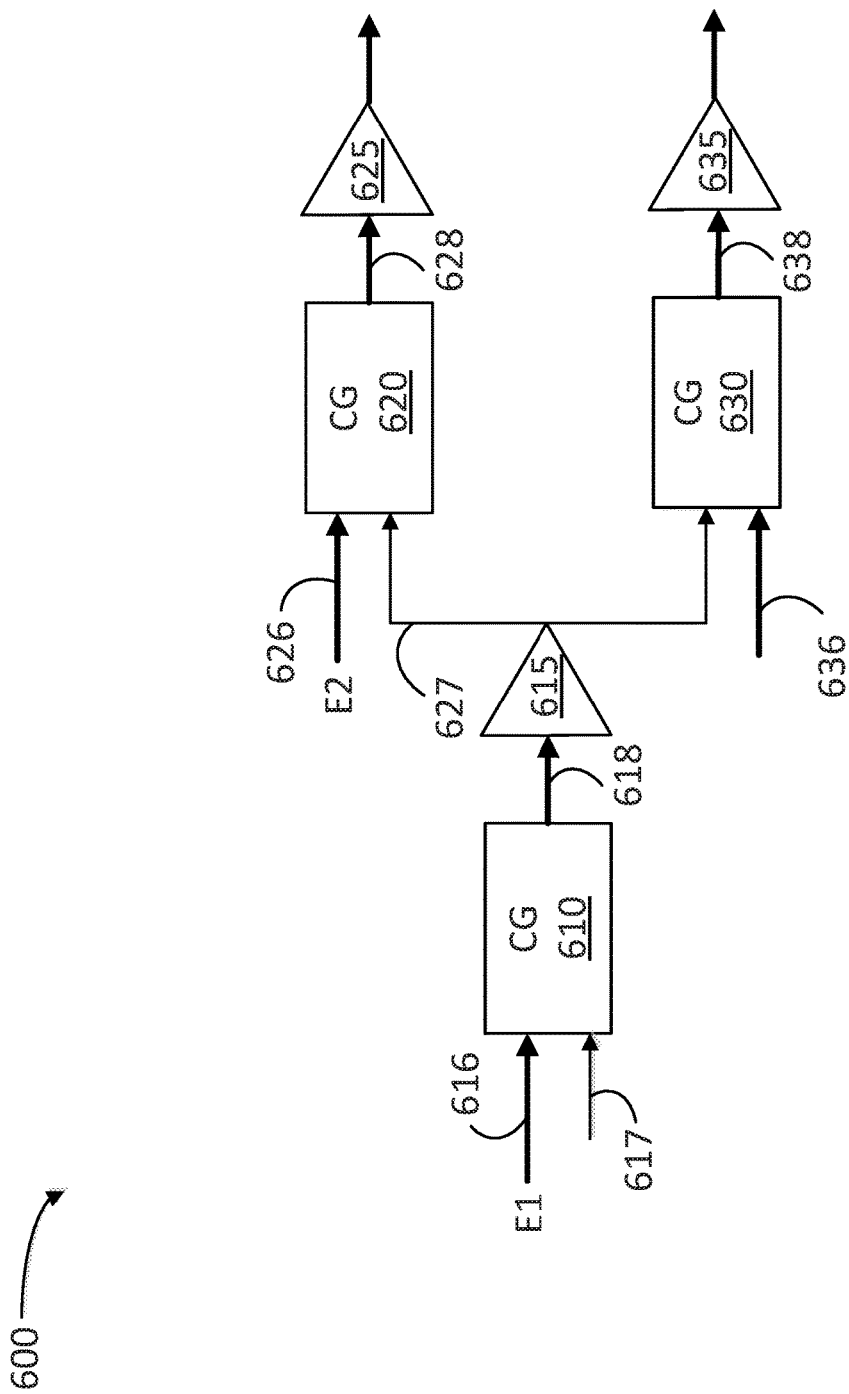
FIG. 6 illustrates a signal flow in a clock tree including clock gates and data buffers, according to some embodiments.

FIG. 6 illustrates a signal flow in a clock tree 600, including clock-gates 610, 620, and 630, and buffers 615, 625, and 635, according to some embodiments. The combination of clock-gate 610 and buffer 615 may be identified as a first clock branch. Likewise, the combination of clock-gate 620 and buffer 625 may be identified as a second clock branch, and the combination of clock-gate 630 and buffer 635 may be identified as a third clock branch. Clock tree 600 may be used for synchronization of the entire circuit in the IC device model. Accordingly, clock tree 600 may be implemented in an HDL code where multiple circuit blocks, perhaps provided by different manufacturers, are synchronized by each of the first, second, and third clock branches.

Clock-gate 610 receives an enable signal 616 (E1) and an external clock signal 617 to issue a clock signal 618. Clock signal 618 is buffered as clock signal 627 to clock-gates 620 and 630 synchronously by buffer 615. In turn, clock-gate 620 receives an enable signal 626 (E2), which is clocked by clock signal 627 to issue clock signal 628, and provided as an output through buffer 625. Likewise, and synchronously with clock-gate 620, clock-gate 630 receives an enable signal 636, which is clocked by clock signal 627 to issue clock signal 638, and provided as an output through buffer 635.

Embodiments consistent with the present disclosure provide a truth table for a clock tree configuration consistent with clock tree 600 to identify redundant frames in the operation of a circuit including clock tree 600. For example, in some configurations the truth table may indicate a high degree of correlation between E1 616 and E2 626, in which case either one of the first or second clock branches may be redundant. A high degree of correlation between E1 616 and E2 626 may be determined when both signals are observed to have the same value (high '1', or low '0'). In some configurations, the truth table may indicate a redundant toggling of either of E1 616 and E2 626. For example, when E1 616 is low ('E1=0'), then toggling of E2 626 may be redundant because clock signal 627 will be low. Likewise, when E2 626 is low ('E2=0'), toggling of clock 617 is redundant because clock signal 628 will be low. The above description is summarized in TABLE I.

TABLE I

| $E_1$ | $E_2$ | |
|---|---|---|
| 0 | 0 | Highly correlated, can be merged |
| 1 | 1 | Highly correlated, can be merged |
| 0 | 1 | E2 logic toggling is redundant |
| 1 | 0 | E1 clock toggling is redundant |

Figure 7A:
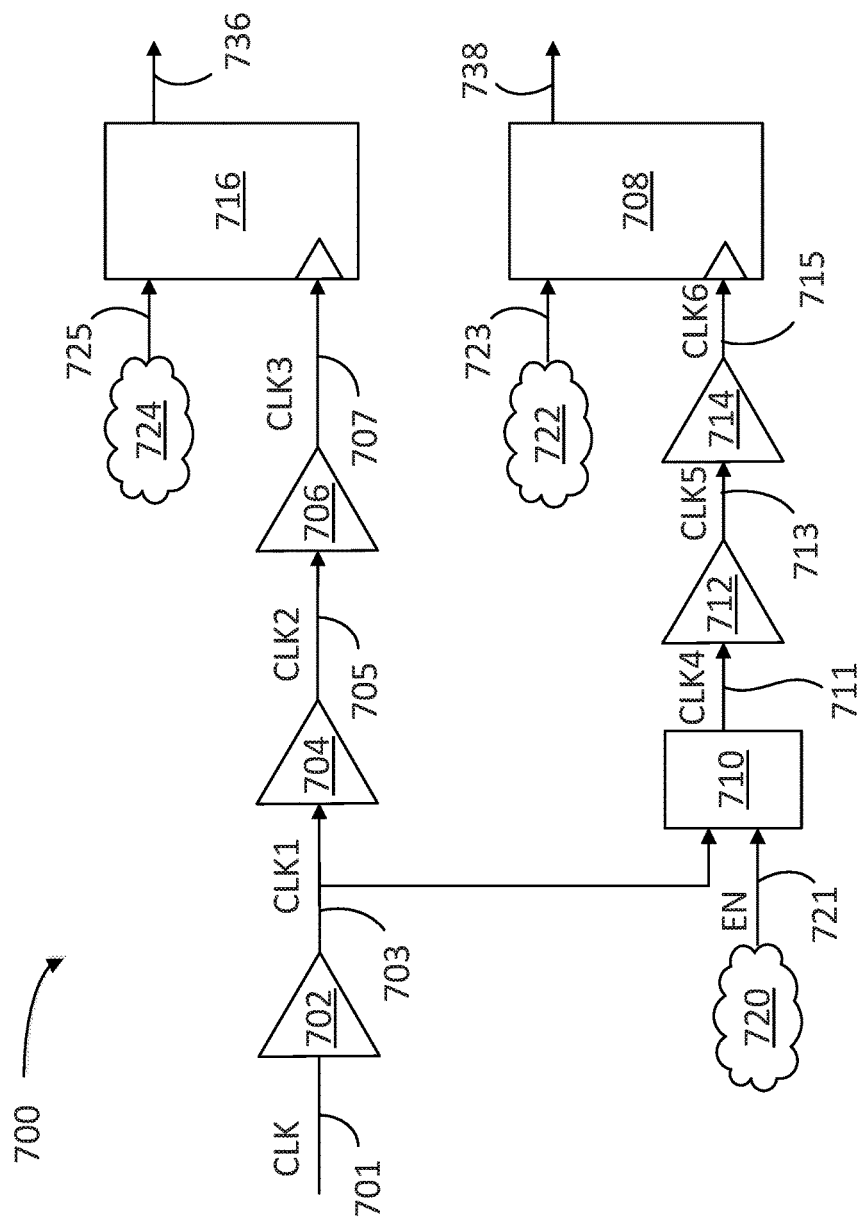
FIG. 7A illustrates a signal flow in a clock tree including clock buffers, registers, and logic inputs, according to some embodiments.

FIG. 7A illustrates a signal flow in a clock tree 700 including data buffers 702, 704, 706, 712, and 714, registers 708 and 716, an ICGC 710, and logic inputs 720, 722, and 724, according to some embodiments. Methods as disclosed herein include identifying frames of non-propagated activities for clock tree 700. In clock tree 700, a clock signal 701 (CLK) drives the clock pin of register 716 through buffers 702, 704 and 706. Buffer 702 receives CLK 701 and buffers clock signal 703 (CLK1) to buffer 704 and to clock-gate 710. Buffer 704 provides clock signal 705 (CLK2) to buffer 706, which in turn provides clock signal 707 (CLK3) to register 716. Clock-gate 710 combines CLK1 703 with enable signal EN 721 from logic input 720 to provide clock signal 711 (CLK4) to buffer 712. Buffer 712 provides clock signal 713 (CLK5) to buffer 714, which in turn provides clock signal 715 (CLK6) to register 708.

Register 708 combines input signal 723 from logic input 722 with CLK6 715 to provide an output signal 738. Likewise, register 716 combines input signal 725 from logic input 724 with CLK3 707 to provide an output signal 736.

FIG. 7B illustrates a plurality of signal waveforms including non-propagating frames 750 and 751 in clock tree circuit 700, according to some embodiments. In frame 750, clock waveforms 701w, 703w, 705w, and 707w indicate that the activity of clocks providing CLK 701, CLK1 703, CLK2 705 and CLK3 707 is redundant because an enabling waveform 721w from EN 721 is low (therefore maintaining output waveform 738w fixed with a data value 738-1). Note that the introduction of ICGC 710 eliminates redundant activity from clock signals CLK4 711, CLK5 713 and CLK6 715 in frame 750. This is indicated by the flat portion of waveforms 711w, 713w, and 715w overlapping frame 750. In frame 751, waveforms 701w, 703w, 705w, 707w, 711w, 713w and 715w indicate that the activity of the entire clock tree (CLK 701, CLK1 703, CLK2 705, CLK3 707, CLK4 711, CLK5 713, and CLK6 715) is redundant because output waveform 736w has transferred data value 736-1 from input pin 725 with no further toggling of data values from logic input 724. Furthermore output waveform 738w toggles from data value 738-1 to data value 738-2 from input pin 723 (waveform 721w is high) with no further toggling of data values from logic input 722. Accordingly, the clock tree activity is redundant when external logic 724 and 725 remain stable with values 736-1 and 738-2 throughout frame 751.

Figure 8A:
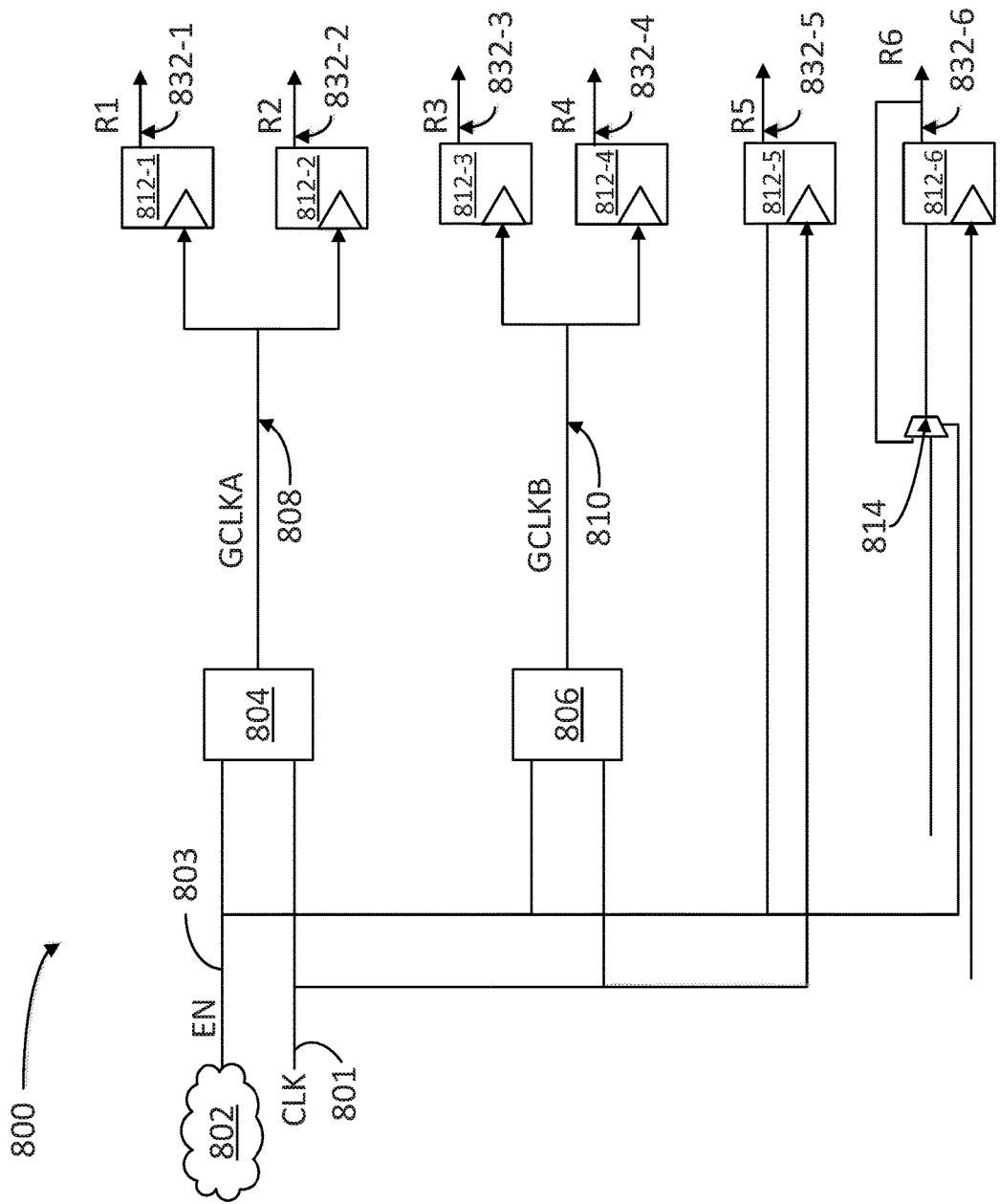
FIG. 8A illustrates a signal flow in a circuit including gated clocks, according to some embodiments.

FIG. 8A illustrates a signal flow in a circuit 800 including gated clocks GCLKA 808 and GCLKB 810, according to some embodiments. Signal 803 (EN) is provided by a logic circuit 802 external to circuit 800. In some embodiments, logic circuit 802 includes combinational logic that can be represented in the form of an expression including waveforms for each of the multiple signals leading up to EN 803 in a circuit simulation. Circuit 800 includes registers 812-1, 812-2, 812-3, 812-4, 812-5, and 812-6 (collectively referred to hereinafter as 'registers 812'). Registers 812 provide output signals through output pins 832-1 (R1), 832-2 (R2), 832-3 (R3), 832-4 (R4), 832-5 (R5), and 832-6 (R6), collectively referred to hereinafter as 'register outputs 832'.

EN 803 enables clock signals to registers 812-1, 812-2, 812-3, 812-4 via ICGCs 804 and 806. EN 803 drives data input for register 812-5 and controls loading of register 812-6 with a synchronous load enable condition circuit 814. In some embodiments, GCLKA 808 and GCLKB 810 are identified as equivalent because they are derived from a same clock input 801 (CLK), and using the same enable function EN 803.

In some embodiments, methods as disclosed herein select registers 812-5 and 812-6 within circuit 800 to make a delayed determination of the state of ICGCs 804 and 806 without having to rely on the state of signal EN 803.

Figure 8B:
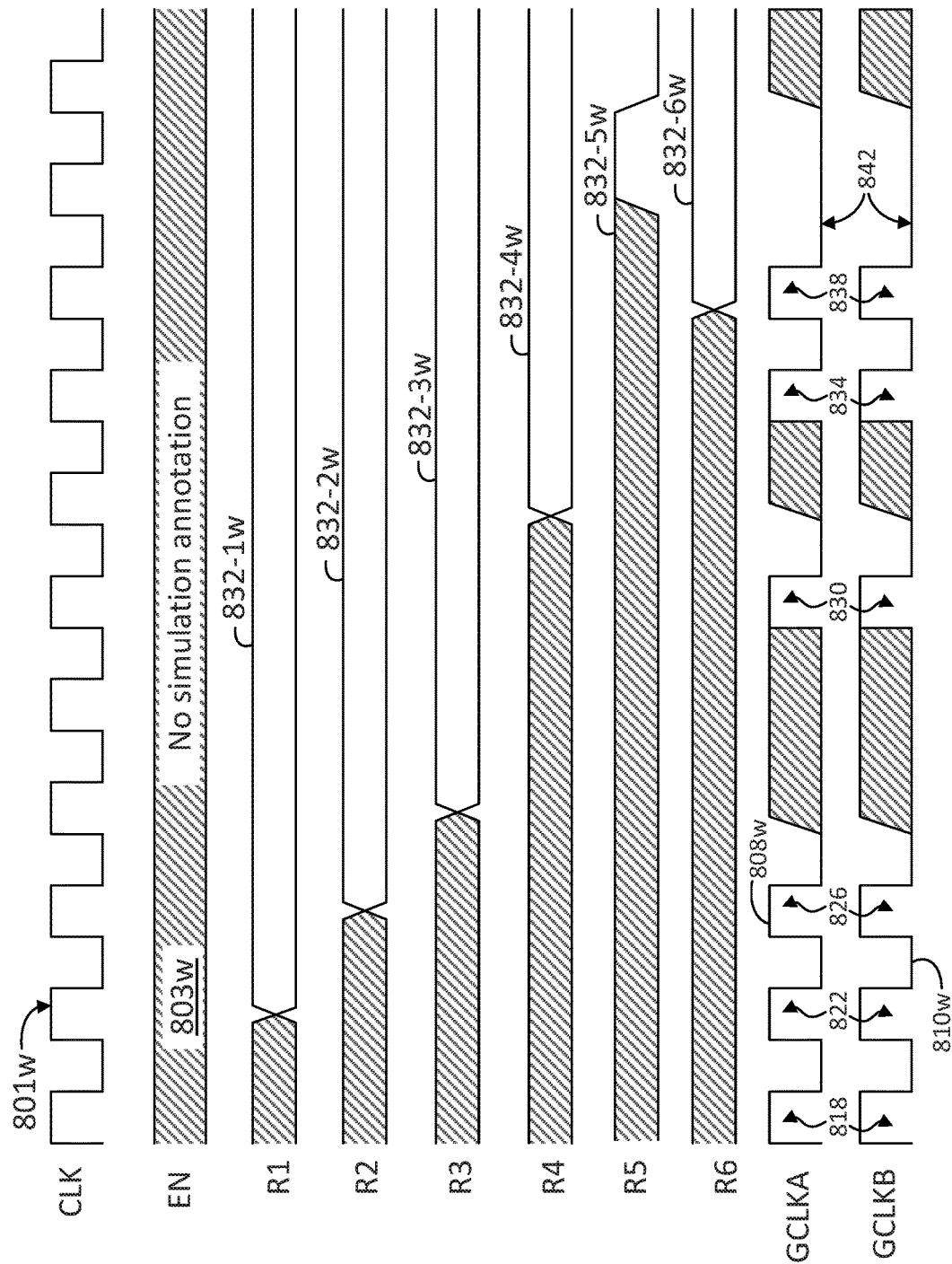
FIG. 8B illustrates a plurality of signal waveforms including estimation of gated clock waveforms in the circuit of FIG. 8A, according to some embodiments.

FIG. 8B illustrates a plurality of signal waveforms including delayed gated clock waveforms 808$w$ (from GCLKA 808) and 810$w$ (from GCLKB 810) in circuit 800, according to some embodiments. A method consistent with the present disclosure may compute 70% of waveform 801$w$ with negligible impact in the runtime, as follows.

A toggle on waveform 832-1$w$ (from R1 832-1) implies that GCLKA 808 and GCLKB 810 went through a clock cycle 818. A toggle on waveform 832-2$w$ (from R2 832-2) implies that gated clock waveforms 808$w$ and 810$w$ went through a clock cycle 822. A toggle on waveform 832-3$w$ (from R3 832-3) implies that gated clock waveforms 808$w$ and 810$w$ went through a clock cycle 826. A toggle on waveform 832-4$w$ (from R4 832-4) implies that gated clock waveforms 808$w$ and 810$w$ went through a clock cycle 830. A toggle on waveform 832-6$w$ (from R6 832-6) implies that gated clock waveforms 808$w$ and 810$w$ went through a clock cycle 834. A high value ('1') on waveform 832-5$w$ (from R5 832-5) implies that gated clock waveforms 808$w$ and 810$w$ went through a clock cycle 838. A low value ('0') on waveform 832-5$w$ implies that gated clock waveforms 808$w$ and 810$w$ stayed inactive through a no-clock cycle 842. Synchronous load enable conditioning circuit 814 guarantees that a toggle for data value 832-6 is synchronous with gated clock waveforms 808$w$ and 810$w$, and that it remains stable through no-clock cycle 842.

Gated clock waveforms 808$w$ and 810$w$ between clock cycles 826 and 830 and between clock cycles 830 and 834 are identified by performing a zero-delay simulation. The zero-delay simulation may be expensive in terms of runtime because it evaluates the logic state of GCLKA 808 and GCLKB 810 by simulating the logic state of EN 803 (input) without relying on the logic state of register 812-5 (output waveform 832-5$w$). For example, in some embodiments EN 803 may be a logic function of three variables "A," "B," and "C" (e.g., "EN=A+B & C"). Accordingly, EN 803 may be unknown, a-priori (e.g., no simulation annotation for waveform 803$w$), but can be determined by knowing the state of A, B and C (at an additional computational cost). If the state of register 832-5 is known (waveform 832-5$w$), there is no need to evaluate EN 803. If the state of register 832-5 is not known (e.g., through unknown portions of waveform 832-5$w$), a zero-delay simulation may be performed at ICGC 806 (cf. waveform 810$w$) by looking for a change in any one of variables "A," "B," or "C" feeding EN 803 from logic circuit 802 (see above).

Figure 9A:
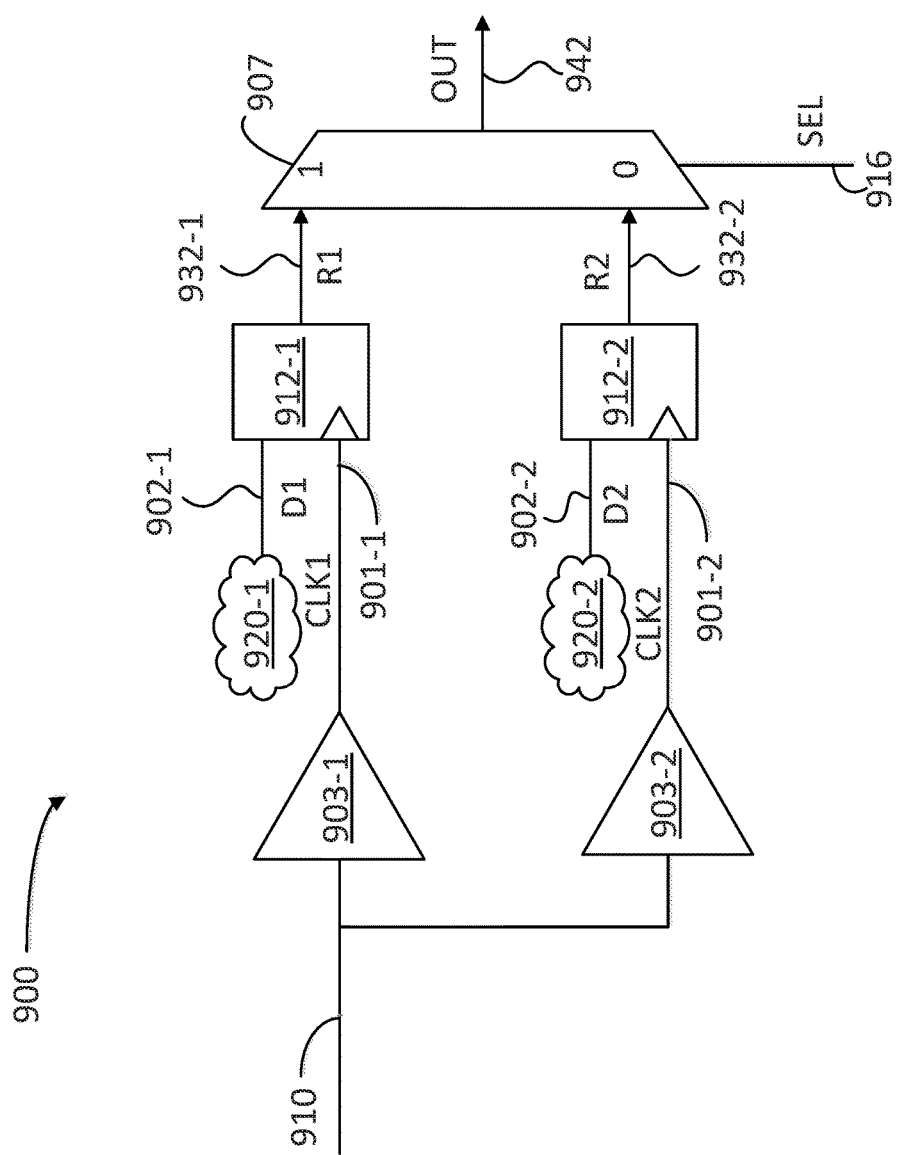
FIG. 9A illustrates a signal flow in a logic circuit, according to some embodiments.

FIG. 9A illustrates a signal flow in a logic circuit 900, according to some embodiments. Logic circuit 900 includes external logic inputs 920-1 and 920-2 feeding data channels 902-1 (D1) and 902-2 (D2) to each of registers 912-1 and 912-2, respectively (hereinafter, collectively referred to as registers 912). Registers 912 also receive clock signal 901-1 (CLK1) and clock signal 901-2 (CLK2), respectively (hereinafter collectively referred to as clock signals 901). Clock signals 901 are fed into logic circuit 900 through signal 910 (CLK), buffered through buffers 903-1 and 903-2, respectively (collectively referred to hereinafter as buffers 903). A multiplexer 907 selects output 932-1 (R1) as an output signal 942 when a signal 916 (SEL) is high, and output 932-2 (R2) as output signal 942 when SEL 916 is low.

FIG. 9B illustrates a plurality of signal waveforms including non-propagating frame 950 in logic circuit 900, according to some embodiments. Non-propagating frame 950 arises from waveform 916$w$ being low while waveform 932-2$w$ is low, and from waveform 916$w$ being high while waveform 932-1$w$ is low. D1 902-1 starts with a low state, and its registered output R1 932-1 starts with a high state in the first clock cycle. D1 902-1 low state causes R1 932-1 to toggle down in the next clock cycle. D1 902-1 toggles to high in the third clock cycle, causing R1 932-1 toggle to high in the next clock cycle. However, the first three toggles of R1 932-1 (fall, rise and then fall of waveform 932-1$w$) are not passed to output waveform 942$w$. Accordingly, the initial toggles of R1 932-1 as well as the corresponding toggles of D1 902-1 are non-propagating. By the same token, the second toggle for D2 902-2 (cf. waveform 902-2$w$), and the third toggle for R2 932-2 prompted by the second toggle for D2 902-2 with one clock cycle delay (cf. waveform 932-2$w$), fail to propagate to output waveform 942$w$ because SEL 916 toggles to a high state (cf. waveform 916$w$).

Figure 9C:
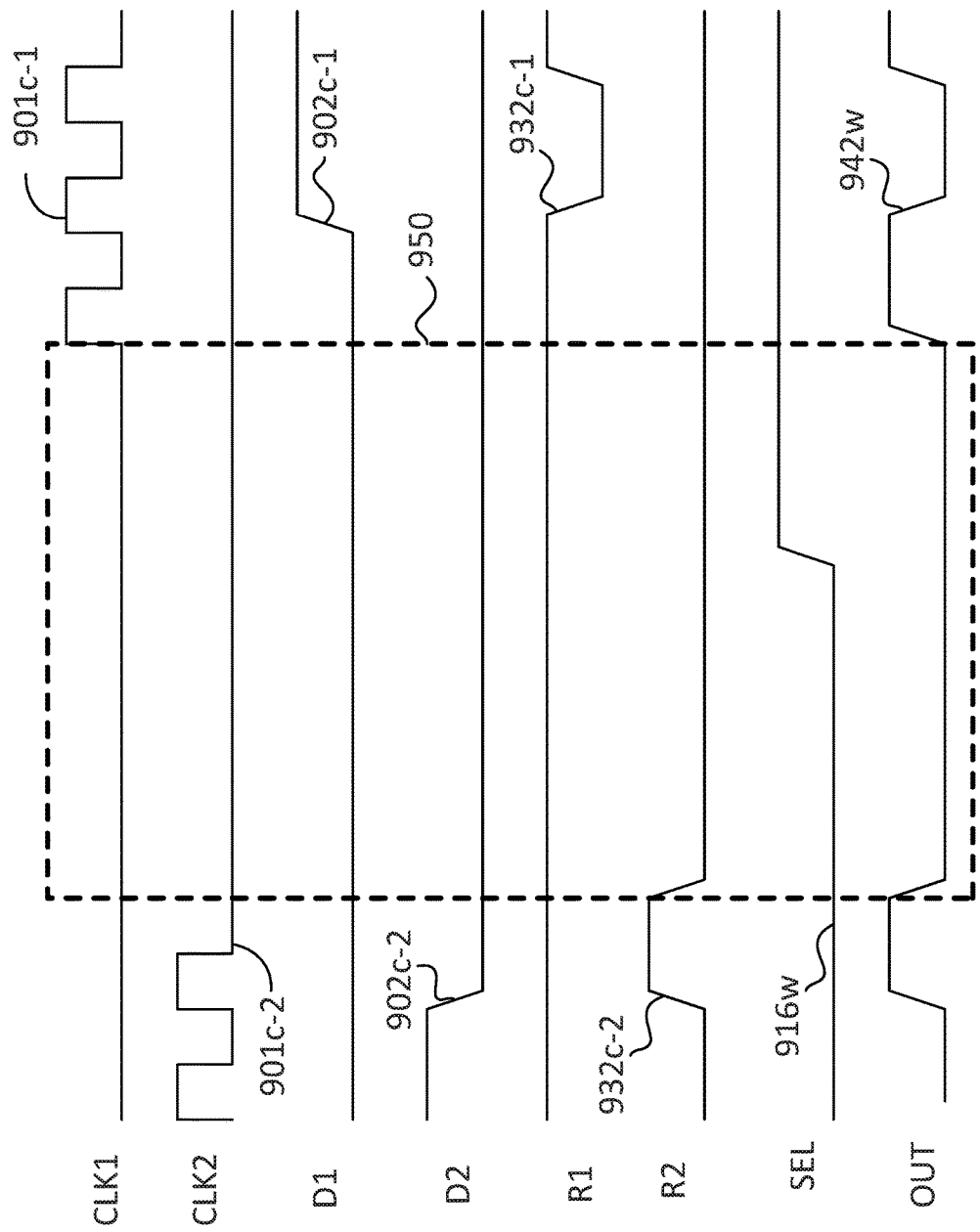
FIG. 9C illustrates the signal waveforms of FIG. 9B modified to include only propagating frames, according to some embodiments.

FIG. 9C illustrates the signal waveforms of FIG. 9B, modified to include only propagating signals, according to some embodiments. The waveforms in FIG. 9C show a steady state within frame 950, while the only toggle occurs for waveform 916$w$ (from SEL 916), which is a signal external to logic circuit 900. Output waveform 942$w$ remains unchanged because this is the waveform that defines frame 950. Clock waveforms 901$c$-1 and 901$c$-2 are inactive within frame 950. Further, waveform 901$c$-1 is inactive while SEL waveform 916$c$ is low (before frame 950), and waveform 901$c$-2 is inactive while SEL waveform 916$w$ is high (after frame 950), due to the selection of registers 912-2 and 912-1 respectively, by multiplexer 907, to form output waveform 942$w$.

Data waveform 902$c$-1 is set to low within framework 950 because SEL waveform 916$w$ is low, thus selecting register 912-2 to form out waveform 942$w$. Data waveform 902$c$-2 is set to low within frame 950 because SEL waveform 916$w$ toggles to high within frame 950, thus selecting register 912-1 to form output waveform 942$w$. Accordingly, FIG. 9C illustrates a remarkable reduction of power usage by logic circuit 900 while rendering the same out waveform 942$w$, compared with FIG. 9B.

FIGS. 2A-C, 3A-B, 4A-B, 5A-C, 6, 7A-B, 8A-B, and 9A-C illustrate different instances of IC modeling in which methods and systems as disclosed herein are applied to determine a total power consumed by a circuit and determine the presence of redundant activity in the form of non-propagating frames (e.g., frames 250-251, 350, 450-455, 550-553, 750, 751, and 950). The non-propagating frames include clock cycling and signal toggling activity that can be removed without affecting performance and reducing the power consumption of an IC model to an ideal power value.

Figure 10:
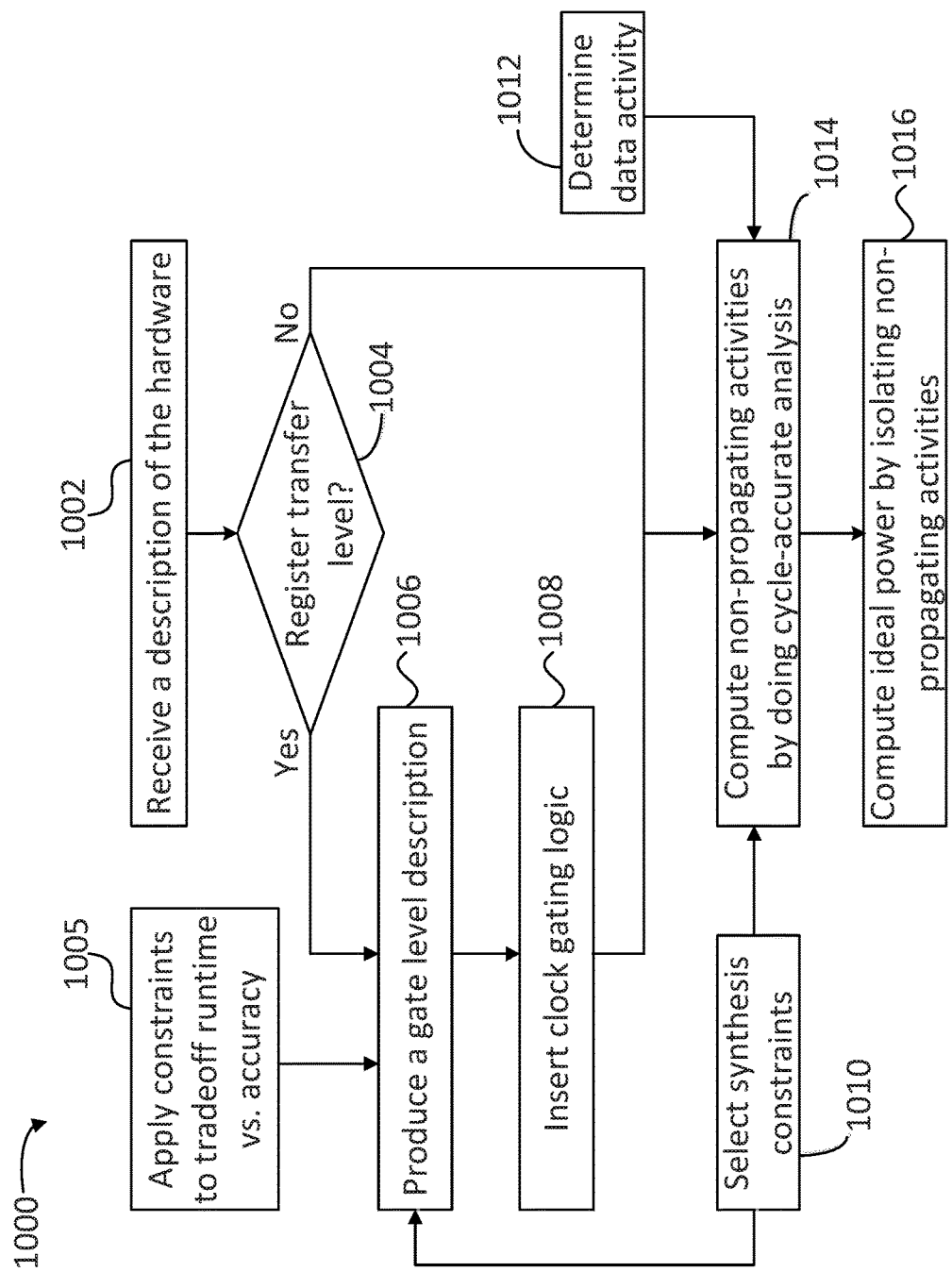
FIG. 10 is a flow chart illustrating steps in a method for determining the ideal power of an IC device model, according to some embodiments.

FIG. 10 shows a flow chart describing a method 1000 for estimating ideal power of an IC device model, according to some embodiments. At least some of the steps in method 1000 may be performed by a computer having a processor executing commands stored in a memory of the computer. Further, steps as disclosed in method 1000 may include retrieving, editing, and/or storing files in a database that is part of, or is communicably coupled to, the computer.

Methods consistent with the present disclosure may include at least some, but not all of the steps illustrated in method 1000, performed in a different sequence. Furthermore, methods consistent with the present disclosure may include at least two or more steps as in method 1000 performed overlapping in time, or almost simultaneously.

Step 1002 includes receiving a description of the IC device model at a hardware level. In some embodiments, step 1002 includes receiving a file coded in hardware description language (HDL).

Step 1004 includes verifying whether the IC device model includes a register transfer (RTL) stage. RTL is a modeling configuration for describing the flow of signals between registers. RTL is technology independent and models synchronous digital circuits in terms of the flow of digital signals (data) between hardware registers, and the logical operations performed on those signals. RTL is one level higher abstraction over a synthesized and technology mapped gate level netlist.

Step 1005 includes applying constraints to tradeoff runtime vs. accuracy. A full-blown synthesis may be time consuming, given the size and complexity of some IC device models. For large and complex IC device models, step 1005 may include adding constraints that reduce runtime while limiting a compromise in model accuracy. In some embodiments, step 1005 includes selecting constraints that reduce the level of synthesis optimizations (computations used to build a generic or gate level representation of an IC device model).

Step 1006 includes producing a gate level description when a register-transfer level (RTL) stage is included in the IC device model. In some embodiments, step 1006 includes an elaboration step for generic technology mapping using a synthesis tool.

Step 1008 includes inserting clock-gating logic into the IC device model. In some embodiments, step 1008 includes inserting clock-gates (ICGCs) into the model by using synchronous load-enable conditions on the registers in the circuit model. In some embodiments step 1008 includes inserting clock-gating logic in a clock tree by buffering sequential clock signals (e.g., clock-gates 710, 804, and 806, and buffers 702, 704, 706, 710, 712, and 714) and inserting a synchronous load enable conditioning circuit on a register (e.g., circuits 207 and 814).

Step 1010 includes selecting synthesis constraints from IC device model considerations such as clock specifications, area specifications, timing specifications, and power specifications. Step 1012 includes determining a time-based data activity. In some embodiments, step 1012 includes forming a stimulus vector in a time-based format, and feed the stimulus vector through inputs in the model. The stimulus vector may be an input vector of simulated circuit activity in a stage prior to a current stage in the simulation.

Step 1014 includes computing non-propagated activities using the synthesis constraints and verifying the results obtained from the stimulus vector. In some embodiments, step 1014 includes annotating activities from the stimulus vector.

Step 1016 includes isolating the non-propagated activities from total activities to get the propagated activities. In some embodiments, step 1016 includes computing a power usage of the model with a power analysis tool using only the propagated activities. This power is the ideal power of a model. In some embodiments, step 1016 may include comparing the ideal power to the actual power used by the circuit to establish the extent to which power of the model can be reduced. Further, according to some embodiments multiple stimulus vectors may be formed, and an ideal power may be determined by performing steps 1014 and 1016 for each stimulus vector. Ideal power of an IC device model may vary according to the type of stimulus vector exercised. For example, an idle stimulus vector including zero or almost zero data activity/toggles. Thus, an idle stimulus vector may identify redundant clock activity. On the other hand, an active mode vector that includes data toggles may identify redundant data and clock activities.

Figure 11:
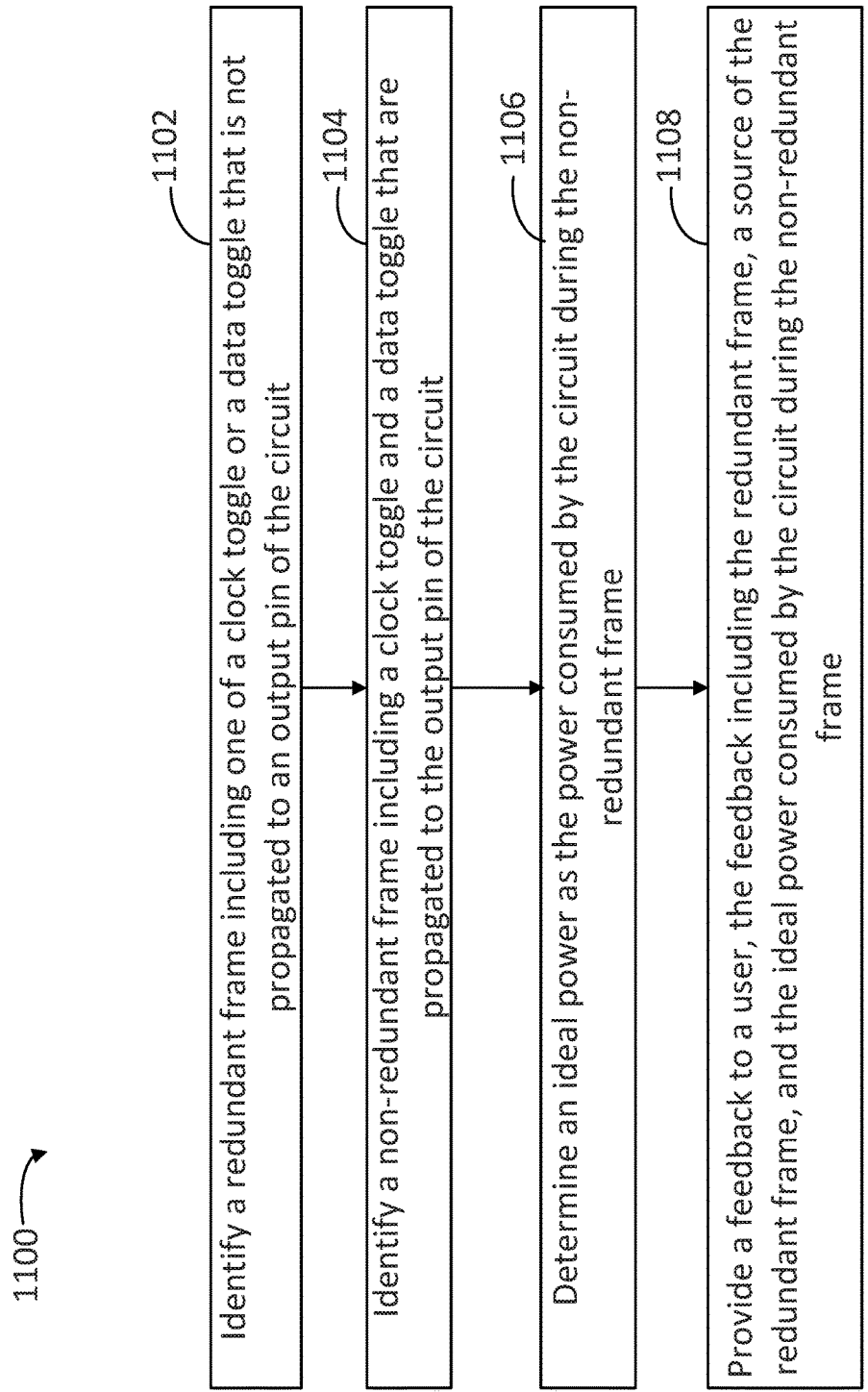
FIG. 11 is a flow chart illustrating steps in a method for determining the ideal power of an IC device model, according to some embodiments.

FIG. 11 is a flow chart illustrating steps in a method 1100 for determining the ideal power of an IC device model, according to some embodiments. At least some of the steps in method 1100 may be performed by a computer having a processor executing commands stored in a memory of the computer. Further, steps as disclosed in method 1100 may include retrieving, editing, and/or storing files in a database that is part of, or is communicably coupled to, the computer. Methods consistent with the present disclosure may include at least some, but not all of the steps illustrated in method 1100, performed in a different sequence. Furthermore, methods consistent with the present disclosure may include at least two or more steps as in method 1100 performed overlapping in time, or almost simultaneously.

Step 1102 includes identifying a redundant frame including one of a clock toggle or a data toggle that is not propagated to an output pin of the circuit. In some embodiments, step 1102 includes performing a delayed estimation of a clock waveform for a clock-gated register when an enable signal into the clock waveform is not available; and performing a zero-delay clock waveform for the clock-gated register when the delayed estimation of the clock waveform is not complete.

Step 1104 includes identifying a non-redundant frame including a clock toggle and a data toggle that are propagated to the output pin of the circuit. Step 1106 includes determining an ideal power as the power consumed by the circuit during the non-redundant frame.

Step 1108 includes providing a feedback to the user, the feedback including the identified redundant frame, a source of the redundant frame, and the ideal power consumed by the circuit during the non-redundant frame. In some embodiments, step 1108 further includes identifying one of a clock signal or a data signal as the source of the redundant frame. In some embodiments, step 1108 further includes forming a signal including an input vector of a simulated circuit activity.

Figure 12:
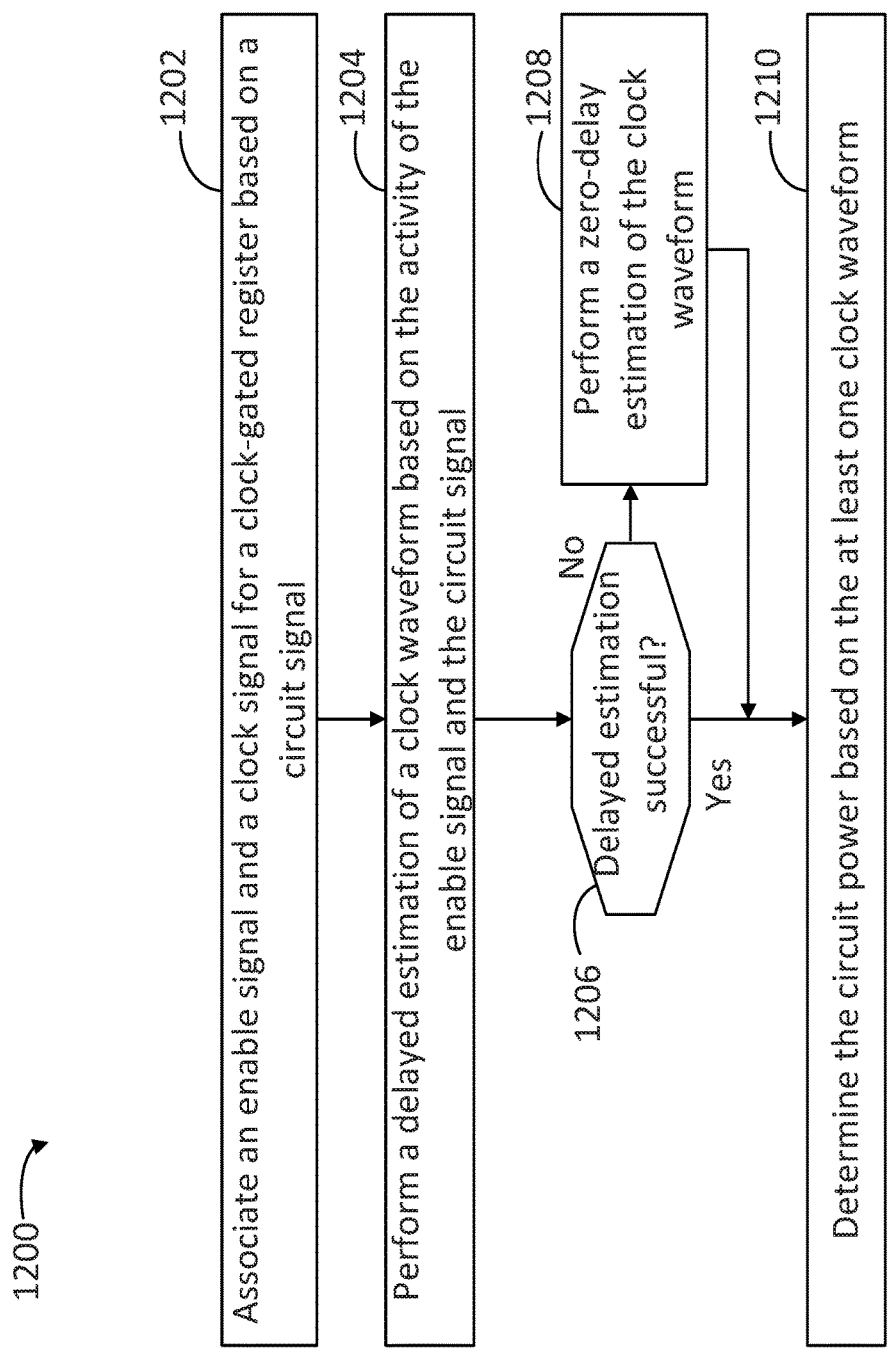
FIG. 12 is a flow chart illustrating steps in a method for determining a clock waveform an IC device model, according to some embodiments.

FIG. 12 is a flow chart illustrating steps in a method 1200 for determining a clock waveform an IC device model, according to some embodiments. Estimation of non-propagated clock activity includes determining or retrieving clock waveforms reaching clock pins of registers in the IC device model. Some clock waveforms may not be available, for example in the case of registers that are clock-gated by a synthesis tool. Method 1200 implements steps to estimate clock waveforms even when they are not available from the IC device model. Methods consistent with method 1200 establish a relation between the enable signals, clock signals and other circuit signals. In some embodiments, methods consistent with method 1200 perform a delayed estimation of a clock waveform by using activity on the related signals. Accordingly, when operation of the circuit with the delayed estimation fails, the method includes performing a zero-delay clock waveform simulation. The zero-delay simulation is performed when a clock signal arrives at a clock-gate and there is a toggle in an EN signal (e.g., EN 204, EN 721 and EN 803). Method 1200 computes frames of propagated activities by subtracting the non-propagated activity frames from the total frames. Power estimation of the IC device model is performed using the propagated activity frames. The estimated power is the ideal power of the IC device model.

At least some of the steps in method 1200 may be performed by a computer having a processor executing commands stored in a memory of the computer. Further, steps as disclosed in method 1200 may include retrieving, editing, and/or storing files in a database that is part of, or is communicably coupled to, the computer. Methods consistent with the present disclosure may include at least some, but not all of the steps illustrated in method 1200, performed in a different sequence. Furthermore, methods consistent with the present disclosure may include at least two or more steps as in method 1200 performed overlapping in time, or almost simultaneously.

Step 1202 includes associating an enable signal and a clock signal for a clock-gate based on a circuit signal (e.g., EN 803, CLK 801, ICGC 804 and ICGC 806). In some embodiments, step 1202 includes forming the circuit signal with an input vector of simulated circuit activity. In some embodiments, the circuit is a memory circuit, and step 1202 includes receiving as the circuit signal one of a write data signal, an address signal, and a write command signal. In some embodiments, the circuit is a data pipeline including at least one register transfer stage, and step 1202 includes receiving as the circuit signal an output from an external logic circuit. In some embodiments, the circuit is a data pipeline including at least one register transfer stage and a multiplexer, and step 1202 includes receiving as the circuit signal, in the multiplexer, an output from the at least one register transfer stage and an output from an external logic circuit. In some embodiments, the circuit includes at least one clock-gate circuit, and step 1202 includes receiving as the circuit signal an output from an external logic circuit in the clock-gate circuit. In some embodiments, the circuit includes a clock tree, and step 1202 includes identifying a redundant activity in one of a first clock branch or a second clock branch in the clock tree from a correlation between the first clock branch and the second clock branch.

Step 1204 includes performing a delayed estimation of a clock waveform based on the activity of the enable signal and the circuit signal. Step 1206 includes verifying whether the delayed estimation successfully completes the clock waveform. When the clock waveform has not been fully estimated and gaps remain within a given frame, step 1208 includes performing a zero-delay clock waveform. In some embodiments, step 1208 includes estimating all or almost all input signals into a gated-clock circuit (e.g., from logic circuit 802 and EN 803).

Step 1210 includes determining the circuit power based on the estimated clock waveform. In some embodiments, step 1210 further includes identifying a redundant frame including at least one clock cycle from the clock waveform, wherein the redundant frame includes at least one signal toggle that is not propagated to an output pin of the circuit. In some embodiments, step 1210 further includes determining an ideal power consumed by the circuit by subtracting a redundant frame from a plurality of activities determined for a plurality of components in the circuit.

Figure 13:
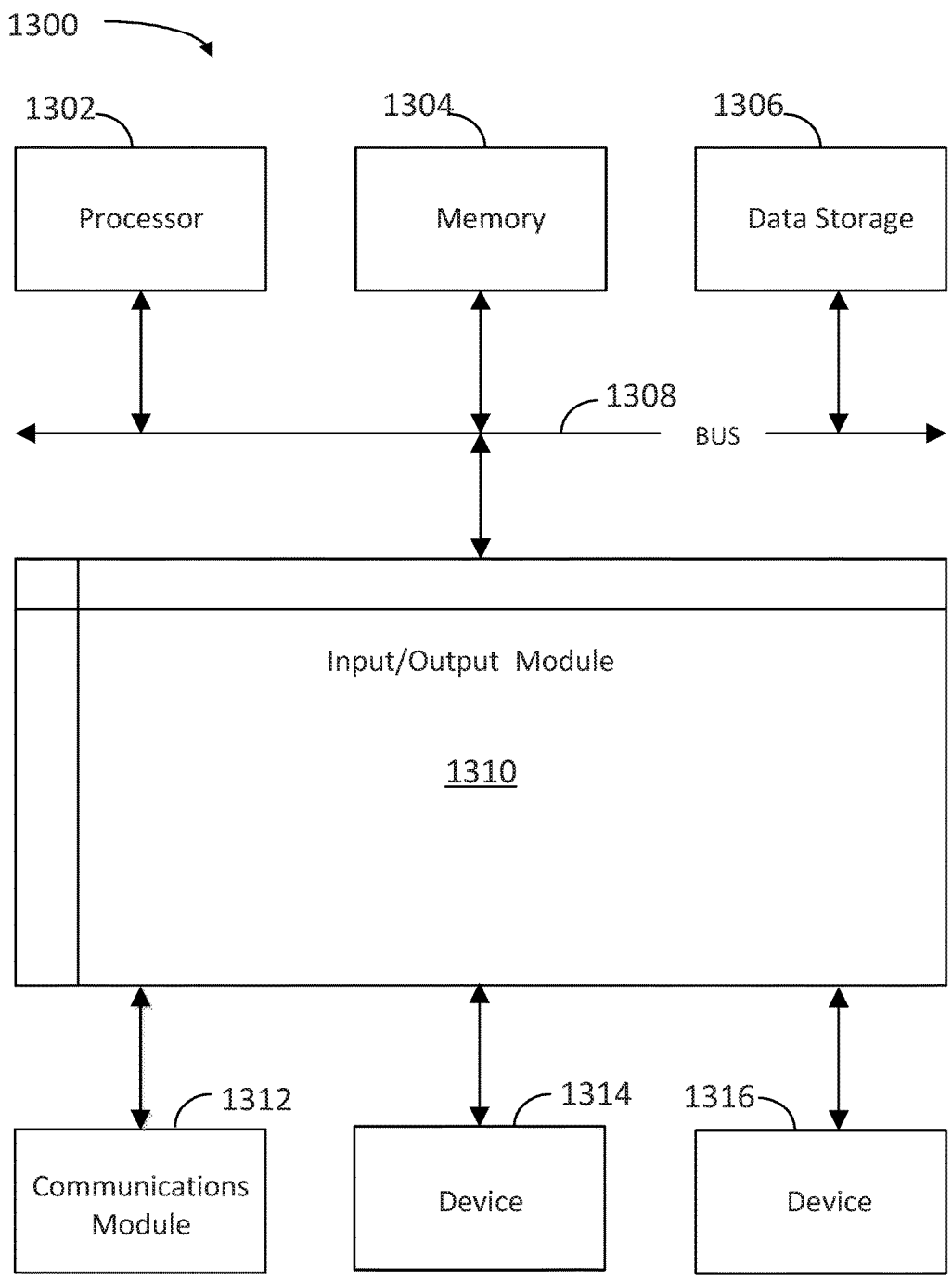
FIG. 13 is a block diagram illustrating an example computer system that includes a tool configured to determine an ideal power of a IC device model, according to some embodiments.

FIG. 13 is a block diagram illustrating an example computer system 1300 with which the methods and steps illustrated in FIGS. 1-12 can be implemented, according to some embodiments. In certain aspects, computer system 1300 can be implemented using hardware or a combination of software and hardware, either in a dedicated server, integrated into another entity, or distributed across multiple entities.

Computer system 1300 includes a bus 1308 or other communication mechanism for communicating information, and a processor 1302 coupled with bus 1308 for processing information. By way of example, computer system 1300 can be implemented with one or more processors 1302. Processor 1302 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 1302 may include modules and circuits configured as a 'placing' tool or engine, or a 'routing' tool or engine, to place devices and route channels in a circuit layout, respectively and as disclosed herein.

Computer system 1300 includes, in addition to hardware, code that creates an execution environment for the computer program in question, e.g., code that constitutes processor firmware, a protocol stack, a database management system, an operating system, or a combination of one or more of them stored in an included memory 1304, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1308 for storing information and instructions to be executed by processor 1302. Processor 1302 and memory 1304 can be supplemented by, or incorporated in, special purpose logic circuitry.

The instructions may be stored in memory 1304 and implemented in one or more computer program products, e.g., one or more modules of computer program instructions encoded on a computer readable medium for execution by, or to control the operation of, the computer system 1300.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 1300 further includes a data storage device 1306 such as a magnetic disk or optical disk, coupled to bus 1308 for storing information and instructions.

Computer system 1300 is coupled via input/output module 1310 to various devices. The input/output module 1310 is any input/output module. Example input/output modules 1310 include data ports such as USB ports. The input/output module 1310 is configured to connect to a communications module 1312. Example communications modules 1312 include networking interface cards, such as Ethernet cards and modems. In certain aspects, the input/output module 1310 is configured to connect to a plurality of devices, such as an input device 1314 and/or an output device 1316. Example input devices 1314 include a keyboard and a pointing device, e.g., a mouse or a trackball, by which a user can provide input to the computer system 1300. Other kinds of input devices 1314 are used to provide for interaction with a user as well, such as a tactile input device, visual input device, audio input device, or brain-computer interface device.

Methods as disclosed herein may be performed by computer system 1300 in response to processor 1302 executing one or more sequences of one or more instructions contained in memory 1304. Such instructions may be read into memory 1304 from another machine-readable medium, such as data storage device 1306. Execution of the sequences of instructions contained in main memory 1304 causes processor 1302 to perform the process steps described herein (e.g., as in methods 1000, 1100 and 1200). One or more processors in a multi-processing arrangement may also be employed to execute the sequences of instructions contained in memory 1304. Processor 1302 may process the executable instructions and/or data structures by remotely accessing the computer program product, for example by downloading the executable instructions and/or data structures from a remote server through communications module 1312 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer readable medium" as used herein refers to any medium or media that participates in providing instructions or data to processor 1302 for execution. Such a medium may take many forms, including, but not limited to, non-volatile media, volatile media, and transmission media.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To the extent that the term "include," "have," or the like is used in the description or the claims, such term is intended to be inclusive in a manner similar to the term "comprise" as "comprise" is interpreted when employed as a transitional word in a claim.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method for determining a power consumed by a circuit, comprising:
    identifying a redundant frame comprising one of a clock toggle or a data toggle that is not propagated to an output pin of the circuit;
    identifying a non-redundant frame comprising a clock toggle and a data toggle that are propagated to the output pin of the circuit;
    determining an ideal power consumed by the circuit during the non-redundant frame; and
    providing a feedback to a user, the feedback comprising the redundant frame, a source of the redundant frame, and the ideal power consumed by the circuit during the non-redundant frame, wherein providing the feedback to the user comprises:
    excluding a source of the redundant frame from an integrated circuit model, and
    providing the integrated circuit model for fabrication of an integrated circuit.

2. The computer-implemented method of claim 1, further comprising identifying one of a clock signal or a data signal as the source of the redundant frame.

3. The computer-implemented method of claim 1, wherein identifying a redundant frame comprises performing a delayed estimation of a clock waveform for a clock-gated register when an enable signal into the clock waveform is not available; and
    performing a zero-delay clock waveform for the clock-gated register when the delayed estimation of the clock waveform is not complete.

4. The computer-implemented method of claim 1, wherein the circuit is a memory circuit, the computer-implemented method further comprising receiving one of a write data signal, an address signal, and a write command signal.

5. The computer-implemented method of claim 1, wherein the circuit is a data pipeline including at least one register transfer stage, the computer-implemented method further comprising receiving an output from an external logic circuit.

6. The computer-implemented method of claim 1, wherein the circuit is a data pipeline including at least one register transfer stage and a multiplexer, the computer-implemented method further comprising receiving, in the multiplexer, an output from the at least one register transfer stage and an output from an external logic circuit.

7. The computer-implemented method of claim 1, wherein the circuit includes at least one clock-gate circuit, the computer-implemented method further comprising receiving an output from an external logic circuit in the clock-gate circuit.

8. The computer-implemented method of claim 1, wherein the circuit includes a clock tree, the computer-implemented method further comprising identifying a redundant activity in one of a first clock branch or a second clock branch in the clock tree from a correlation between the first clock branch and the second clock branch.

9. The computer-implemented method of claim 1, wherein identifying the source of the redundant frame comprises forming a signal comprising an input vector of a simulated circuit activity.

10. A system, comprising:
    a memory, storing computer code; and
    a processor that executes the computer code to:
        identify a redundant frame comprising one of a clock toggle or a data toggle that is not propagated to an output pin of a circuit;
        identify a non-redundant frame comprising a clock toggle and a data toggle that are propagated to the output pin of the circuit;
        determine an ideal power consumed by the circuit during the non-redundant frame; and
        provide a feedback to a user, the feedback comprising the redundant frame, a source of the redundant frame, and the ideal power consumed by the circuit during the non-redundant frame wherein to provide the feedback to the user comprises:
        excluding a source of the redundant frame from an integrated circuit model, and
        providing the integrated circuit model for fabrication of an integrated circuit.

11. The system of claim 10, further wherein the processor executes the computer code to identify one of a clock signal or a data signal as a source of the redundant frame.

12. The system of claim 10, wherein the circuit is a memory circuit, and the processor executes the computer code to receive one of a write data signal, an address signal, and a write command signal.

13. The system of claim 10, wherein the circuit is a data pipeline including at least one register transfer stage, and the processor executes the computer code to receive an output from an external logic circuit.

14. The system of claim 10, wherein the circuit is a data pipeline including at least one register transfer stage and a multiplexer, and the processor executes the computer code to receive, in the multiplexer, an output from the at least one register transfer stage and an output from an external logic circuit.

15. The system of claim 10, wherein the circuit includes at least one clock-gate circuit, and the processor executes the computer code to receive an output from an external logic circuit in the clock-gate circuit.

16. The system of claim 10, wherein the circuit includes a clock free, and the processor executes the computer code to identify a redundant activity in one of a first clock branch or a second clock branch in the clock tree from a correlation between the first clock branch and the second clock branch.

17. The system of claim 10, further wherein the processor executes the computer code to identify the source of the redundant frame with a signal comprising an input vector of simulated circuit activity.

18. A non-transitory, machine-readable storage medium comprising machine-readable instructions for causing a processor to execute a method for placing and routing devices in a circuit, the method comprising:
    identifying a redundant frame comprising one of a clock toggle or a data toggle that is not propagated to an output pin of the circuit;
    identifying a non-redundant frame comprising a clock toggle and a data toggle that are propagated to the output pin of the circuit;
    determining an ideal power consumed by the circuit during the non-redundant frame; and
    providing a feedback to a user, the feedback comprising the redundant frame, a source of the redundant frame, and the ideal power consumed by the circuit during the non-redundant frame, wherein providing the feedback to the user comprises:
    excluding a source of the redundant frame from an integrated circuit model, and
    providing the integrated circuit model for fabrication of an integrated circuit.

19. The non-transitory, machine-readable storage medium of claim 18, wherein the method executed by the processor further comprises identifying one of a clock signal or a data signal as the source of the redundant frame.

20. The non-transitory, machine-readable storage medium of claim 18, wherein the circuit is a memory circuit, and the method executed by the processor further comprises receiving one of a write data signal, an address signal, and a write command signal.

* * * * *